US012208617B2

(12) United States Patent
Okui

(10) Patent No.: US 12,208,617 B2
(45) Date of Patent: Jan. 28, 2025

(54) HEAD CHIP, LIQUID EJECTING HEAD, AND LIQUID EJECTING APPARATUS

(71) Applicant: SEIKO EPSON CORPORATION, Tokyo (JP)

(72) Inventor: Hiroaki Okui, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 149 days.

(21) Appl. No.: 18/051,112

(22) Filed: Oct. 31, 2022

(65) Prior Publication Data

US 2023/0136678 A1 May 4, 2023

(30) Foreign Application Priority Data

Nov. 2, 2021 (JP) ................................ 2021-179518
Feb. 18, 2022 (JP) ................................ 2022-023607

(51) Int. Cl.
*B41J 2/14* (2006.01)

(52) U.S. Cl.
CPC .. *B41J 2/14233* (2013.01); *B41J 2002/14241* (2013.01); *B41J 2002/14459* (2013.01); *B41J 2002/14491* (2013.01)

(58) Field of Classification Search
CPC .......... B41J 2/14233; B41J 2002/14241; B41J 2002/14459; B41J 2002/14491;
(Continued)

(56) References Cited

U.S. PATENT DOCUMENTS

2017/0210131 A1* 7/2017 Naito .................. B41J 2/14233
2020/0207083 A1 7/2020 Ozawa

FOREIGN PATENT DOCUMENTS

JP 2018-051844 A 4/2018
JP 2020-104456 A 7/2020

* cited by examiner

*Primary Examiner* — Lisa Solomon
(74) *Attorney, Agent, or Firm* — WORKMAN NYDEGGER

(57) ABSTRACT

There is provided a head chip including: a first-nozzle; a second-nozzle; a first-pressure-chamber communicating with the first-nozzle; a second-pressure-chamber communicating with the first-nozzle; a third-pressure-chamber communicating with the second-nozzle; a fourth-pressure-chamber communicating with the second-nozzle; a first-piezoelectric-body generating a pressure in the first-pressure-chamber; a second-piezoelectric-body generating a pressure in the second-pressure-chamber; a third-piezoelectric-body generating a pressure in the third-pressure-chamber; a fourth-piezoelectric-body generating a pressure in the fourth-pressure-chamber; a first-individual-electrode coupled to the first-piezoelectric-body; a second-individual-electrode coupled to the second-piezoelectric-body; a third-individual electrode coupled to the third-piezoelectric-body; a fourth-individual-electrode coupled to the fourth-piezoelectric-body; a first-common-electrode commonly coupled to the first-piezoelectric-body and the third-piezoelectric-body; and a second-common-electrode that is independent of the first-common-electrode and is commonly coupled to the second-piezoelectric-body and the fourth-piezoelectric-body.

16 Claims, 14 Drawing Sheets

(58) Field of Classification Search
CPC B41J 2/04541; B41J 2/04555; B41J 2/04581; B41J 2/04588; B41J 2002/14338; B41J 2002/14419; B41J 2202/03; B41J 2202/19; B41J 2202/20; B41J 2/14201
See application file for complete search history.

HEAD CHIP, LIQUID EJECTING HEAD, AND LIQUID EJECTING APPARATUS

The present application is based on, and claims priority from JP Application Serial Number 2022-023607, filed Feb. 18, 2022 and JP Application Serial Number 2021-179518, filed Nov. 2, 2021, the disclosures of which are hereby incorporated by reference herein in their entirety.

BACKGROUND

1. Technical Field

The present disclosure relates to a head chip, a liquid ejecting head, and a liquid ejecting apparatus.

2. Related Art

A liquid ejecting apparatus represented by a piezo type ink jet printer generally includes a pressure chamber communicating with a nozzle and a piezoelectric element that causes pressure fluctuation in the pressure chamber. Here, for example, as disclosed in JP-A-2020-104456, a plurality of pressure chambers and a plurality of piezoelectric elements may be provided for one nozzle.

The head unit described in JP-A-2020-104456 includes a first pressure chamber and a second pressure chamber communicating with one nozzle, a first piezoelectric element corresponding to the first pressure chamber, a second piezoelectric element corresponding to the second pressure chamber, and a wiring substrate coupled to a switch circuit. Here, each of the first piezoelectric element and the second piezoelectric element includes a first electrode, a second electrode, and a piezoelectric layer sandwiched between both electrodes. Further, the first electrodes of the first piezoelectric element and the second piezoelectric element are common electrodes coupled to a common power supply line. On the other hand, the second electrodes of the first piezoelectric element and the second piezoelectric element are individual electrodes. Individual driving signals are sent from the switch circuit to the second electrodes of each of the first piezoelectric element and the second piezoelectric element.

Incidentally, in the related art, for example, as disclosed in JP-A-2018-51844, the natural frequency of a vibration section by a piezoelectric element may be measured. In the method described in JP-A-2018-51844, a measuring instrument called an impedance analyzer is used to measure the natural frequency of the vibration section by a piezoelectric actuator based on the result of measuring the impedance when a specific Sin wave is input into the piezoelectric actuator.

In JP-A-2020-104456, separate driving signals are sent from the switch circuit to the piezoelectric elements corresponding to the two pressure chambers communicating with the common nozzle. Therefore, the number of switching elements increases, and as a result, there is a possibility that the wiring substrate on which the switch circuit is mounted becomes large, or the switch circuit is overheated. Therefore, it is conceivable to reduce the size of the wiring substrate and suppress the heat generation of the switch circuit by sending a common driving signal to the individual electrodes of the two piezoelectric elements corresponding to the common nozzle.

However, in JP-A-2020-104456, two piezoelectric elements corresponding to a common nozzle are coupled to the same common electrode, and a power supply line for supplying power to the common electrode is also shared.

Therefore, in JP-A-2020-104456, when a configuration in which a common driving signal is sent to the individual electrodes of the two piezoelectric elements corresponding to the common nozzle is adopted, by using the method described in JP-A-2018-51844, it is not possible to measure the natural frequencies of the two vibration sections corresponding to a common nozzle separately. Therefore, in this case, it is not possible to determine whether or not there is a characteristic difference between the two vibration sections. Under the above circumstances, in a configuration in which a plurality of pressure chambers are provided for one nozzle, it is desired to reduce the size of the head chip and suppress heat generation, and to inspect the performance of each pressure chamber.

SUMMARY

According to an aspect of the present disclosure, there is provided a head chip including: a first nozzle that ejects a liquid; a second nozzle that ejects a liquid; a first pressure chamber communicating with the first nozzle; a second pressure chamber communicating with the first nozzle; a third pressure chamber communicating with the second nozzle; a fourth pressure chamber communicating with the second nozzle; a first piezoelectric body that generates a pressure in the first pressure chamber; a second piezoelectric body that generates a pressure in the second pressure chamber; a third piezoelectric body that generates a pressure in the third pressure chamber; a fourth piezoelectric body that generates a pressure in the fourth pressure chamber; a first individual electrode coupled to the first piezoelectric body; a second individual electrode coupled to the second piezoelectric body; a third individual electrode coupled to the third piezoelectric body; a fourth individual electrode coupled to the fourth piezoelectric body; a first common electrode commonly coupled to the first piezoelectric body and the third piezoelectric body; and a second common electrode that is independent of the first common electrode and is commonly coupled to the second piezoelectric body and the fourth piezoelectric body.

According to another aspect of the present disclosure, there is provided a liquid ejecting head including: the above-described head chip; and a relay substrate coupled to the head chip.

According to still another aspect of the present disclosure, there is provided a liquid ejecting apparatus including: the above-described liquid ejecting head; and a wiring member coupled to the liquid ejecting head.

DESCRIPTION OF EXEMPLARY EMBODIMENTS

Figure 1:
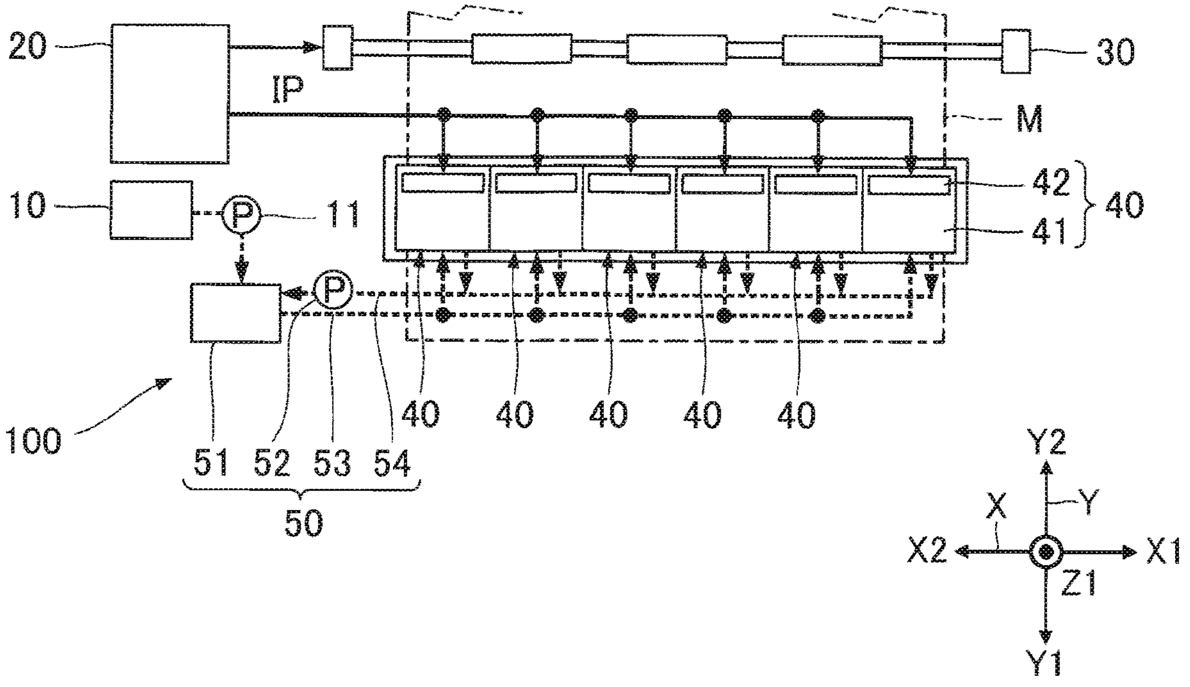
FIG. 1 is a schematic view illustrating a liquid ejecting apparatus according to a first embodiment.

Hereinafter, preferred embodiments according to the present disclosure will be described with reference to the attached drawings. In the drawings, the dimensions and scale of each part may appropriately differ from the actual ones, and some parts are schematically illustrated for ease of understanding. Further, the scope of the present disclosure is not limited to these aspects unless otherwise stated to limit the disclosure in the following description.

In the following description, for convenience, an X axis, a Y axis, and a Z axis that intersect each other are appropriately used. In the following, one direction along the X axis is an X1 direction, and the direction opposite to the X1 direction is an X2 direction. Similarly, the directions opposite to each other along the Y axis are a Y1 direction and a Y2 direction. In addition, the directions opposite to each other along the Z axis are a Z1 direction and a Z2 direction. In the following, viewing in the Z1 direction or the Z2 direction may be referred to as "plan view".

Here, typically, the Z axis is a vertical axis, and the Z2 direction corresponds to a downward direction in the vertical direction. However, the Z axis does not have to be a vertical axis and may be inclined with respect to the vertical axis. In addition, the X axis, the Y axis, and the Z axis are typically orthogonal to each other, but are not limited thereto, and may intersect each other at an angle within the range of 80° or more and 100° or less, for example.

1. First Embodiment

1-1. Liquid Ejecting Apparatus

FIG. 1 is a schematic view illustrating a liquid ejecting apparatus 100 according to a first embodiment. The liquid ejecting apparatus 100 is an ink jet type printing apparatus that ejects ink, which is an example of a liquid, as droplets onto a medium M. The liquid ejecting apparatus 100 of the present embodiment is a so-called line type printing apparatus in which a plurality of nozzles for ejecting ink are distributed over the entire range in the width direction of the medium M. The medium M is typically a printing paper sheet. The medium M is not limited to a printing paper sheet, and may be a printing target of any material such as a resin film or cloth.

As illustrated in FIG. 1, the liquid ejecting apparatus 100 includes a liquid container 10, a control unit 20, a transport mechanism 30, a plurality of head units 40, and a circulation mechanism 50.

The liquid container 10 stores ink. Specific examples of the liquid container 10 include a cartridge that is attachable to and detachable from the liquid ejecting apparatus 100, a bag-like ink pack formed of a flexible film, an ink tank that can be refilled with ink, and the like. Any type of ink may be stored in the liquid container 10. The ink in the liquid container 10 is transferred to a sub tank 51 by a pump 11 arranged between the liquid container 10 and the sub tank 51 to be described later.

The control unit 20 controls the operation of each element of the liquid ejecting apparatus 100. The control unit 20 includes a processing circuit such as a central processing unit (CPU) or a field programmable gate array (FPGA), and a storage circuit such as a semiconductor memory. Various programs and various data are stored in the storage circuit. The processing circuit realizes various controls by executing the program and using the data as appropriate.

The transport mechanism 30 transports the medium M under the control of the control unit 20. In the example illustrated in FIG. 1, the transport mechanism 30 transports the medium M in the Y1 direction. The transport mechanism 30 includes, for example, a long transport roller along the X axis and a motor that rotates the transport roller. In addition, the transport mechanism 30 is not limited to the configuration using a transport roller, and may be configured to use, for example, a drum or an endless belt that transports the medium M in a state of being attracted to the outer peripheral surface by an electrostatic force or the like.

Under the control of the control unit 20, each of the plurality of head units 40 ejects ink supplied from the liquid container 10 via the circulation mechanism 50 from each of the plurality of nozzles onto the medium M.

In the example illustrated in FIG. 1, each of the plurality of head units 40 has a liquid ejecting head 41 and a drive module 42. The plurality of liquid ejecting heads 41 constitute a line head arranged such that a plurality of nozzles are distributed over the entire range of the medium M in the direction of the X axis, and eject ink in the Z2 direction. The drive module 42 drives the liquid ejecting head 41 based on image information IP from the control unit 20. The image information IP is information based on data indicating an image to be printed. In addition, the number of head units 40 is not limited to the example illustrated in FIG. 1, and is any number.

The circulation mechanism 50 is a mechanism for supplying ink to each head unit 40 and collecting the ink discharged from each head unit 40 for resupplying the ink to the head unit 40. The circulation mechanism 50 includes, for example, the sub tank 51 for storing the ink supplied from the liquid container 10, a supply flow path 53 for supplying the ink from the sub tank 51 to the head unit 40, a collecting flow path 54 for collecting ink from the head unit to the sub tank, and a pump 52 for transferring ink to each of these flow paths. By the operation of the circulation mechanism 50 as described above, it is possible to suppress an increase in the viscosity of the ink and reduce the retention of air bubbles in the ink.

1-2. Head Unit

Figure 2:
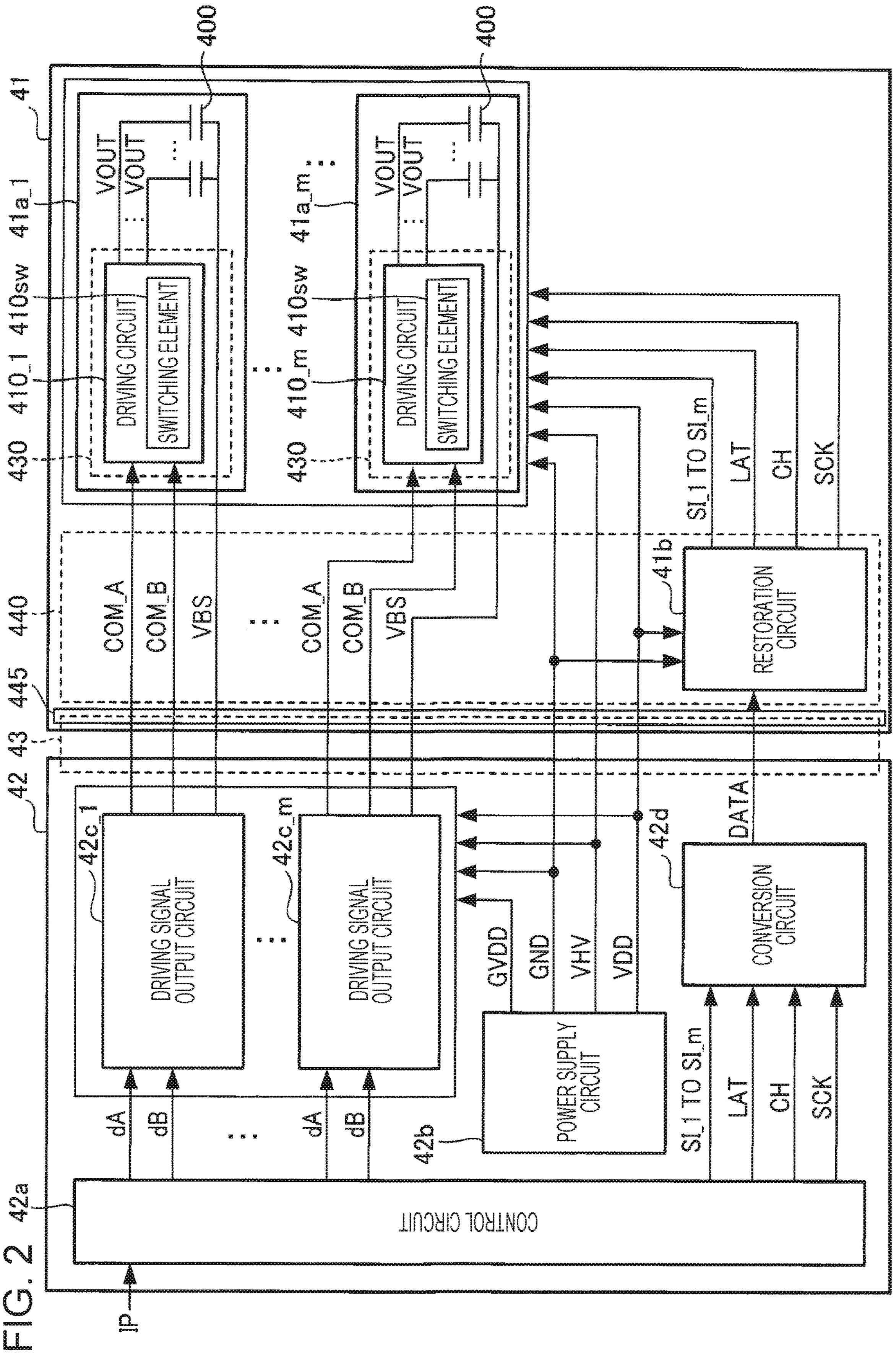
FIG. 2 is a block diagram of a head unit of the liquid ejecting apparatus according to the first embodiment.
Figure 3:
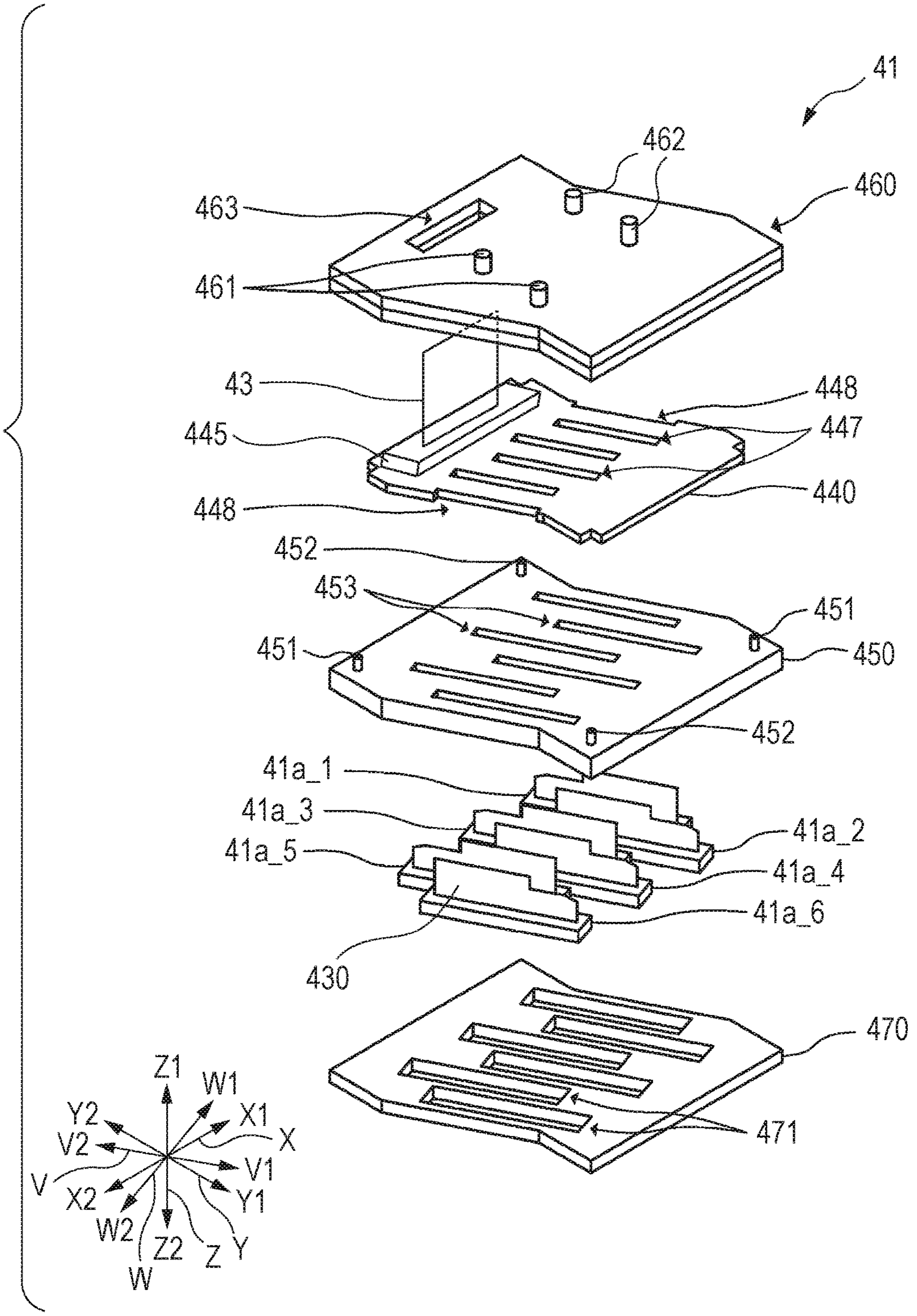
FIG. 3 is an exploded perspective view of a liquid ejecting head according to the first embodiment.

FIG. 2 is a block diagram of the head unit 40 of the liquid ejecting apparatus 100 according to the first embodiment. As described above, the head unit 40 has a liquid ejecting head 41 and a drive module 42. The liquid ejecting head 41 and the drive module 42 are electrically coupled to each other via a wiring member 43. FIG. 3 is an exploded perspective view of the liquid ejecting head 41. Note that FIG. 3 also illustrates the wiring member 43.

The wiring member 43 is a flexible member for electrically coupling the liquid ejecting head 41 and the drive module 42 to each other. Specifically, for example, the wiring member 43 is a flexible printed circuits (FPC) or a flexible flat cable (FFC). In addition, the configuration for electrically coupling the liquid ejecting head 41 and the drive module 42 to each other is not limited to the configuration using the wiring member 43, and may be, for example, a configuration using a board to board (BtoB) connector or may be a configuration using both the BtoB connector and an FPC or FFC.

As illustrated in FIG. 2, the drive module 42 includes a control circuit 42*a*, a power supply circuit 42*b*, driving signal output circuits 42*c*_1 to 42*c*_*m*, and a conversion circuit 42*d*. Note that m is a natural number of 2 or more, and corresponds to the number of head chips 41*a* (to be described later) mounted on the liquid ejecting head 41. Further, in the following, each of the driving signal output circuits 42*c*_1 to 42*c*_*m* may be referred to as a driving signal output circuit 42*c*. Further, in the following, the subscripts "_1" to "_m" are added to the codes of the elements corresponding to the driving signal output circuits 42*c*_1 to 42*c*_*m*.

The power supply circuit 42*b* receives power from a commercial power source (not illustrated) and generates a power supply potential GVDD, a ground potential GND, a high potential side power supply potential VHV, and a low potential side power supply potential VDD. Each of these potentials is a constant potential. Specifically, for example, the power supply potential GVDD is approximately 7.5 V, the ground potential GND is approximately 0 V, the power supply potential VHV is approximately 42 V, and the power supply potential VDD is approximately 3.3 V. Each of these potentials is supplied to each of the driving signal output circuits 42*c*_1 to 42*c*_*m*. In addition, of these potentials, each of the ground potential GND, the power supply potential VHV, and the power supply potential VDD is supplied to the liquid ejecting head 41 via the wiring member 43 in addition to the driving signal output circuits 42*c*_1 to 42*c*_*m*.

The control circuit 42*a* is composed of, for example, a processing circuit such as a CPU or FPGA, and outputs various types of data and various signals based on the image information IP input from the control unit 20.

Here, the control circuit 42*a* generates print data signals SI_1 to SI_m, a latch signal LAT, a change signal ch, and a clock signal SCK based on the image information IP. Each signal generated by this generation is input into the conversion circuit 42*d*. Each of the print data signals SI_1 to SI_m is a digital signal for designating the type of operation of a piezoelectric element 400 to be described later. Specifically, each of the print data signals SI_1 to SI_m designates the type of operation of the piezoelectric element 400 by designating whether to supply driving signals COM_A and COM_B to the piezoelectric element 400. The latch signal LAT and the change signal CH are used in combination with the print data signals SI_1 to SI_m, and define the drive timing of the piezoelectric element 400. The timing of the pulses contained in these signals is defined based on the clock signal SCK. In addition, in the following, each of the print data signals SI_1 to SI_m may be referred to as a print data signal SI. Further, each of the driving signals COM_A and COM_B may be referred to as a driving signal COM.

The conversion circuit 42*d* generates a data signal DATA by converting the print data signals SI_1 to SI_m, the latch signal LAT, the change signal CH, and the clock signal SCK into a differential signal such as low voltage differential signaling (LVDS). The data signal DATA is input into the liquid ejecting head 41 via the wiring member 43. In addition, the data signal DATA is not limited to LVDS, and may be, for example, a high-speed transfer type differential signal such as a low voltage positive emitter coupled logic (LVPECL) or a current mode logic (CML), or may be a signal having a part or all of the print data signals SI_1 to SI_m, the latch signal LAT, the change signal ch, and the clock signal SCK as a single end.

Further, the control circuit 42*a* generates driving data dA and dB. Each of the driving data dA and dB is input into each of the driving signal output circuits 42*c*_1 to 42*c*_*m*.

The driving signal output circuit 42*c* generates the driving signal COM_A based on the driving data dA and also generates the driving signal COM_B based on the driving data dB. The ground potential GND, the power supply potential VHV, and the power supply potential VDD are used for this generation. Here, for example, the driving signal output circuit 42*c* generates the driving signal COM_A by converting the driving data dA from a digital signal to an analog signal and then applying class D amplification to the analog signal. Similarly, the driving signal output circuit 42*c* generates the driving signal COM_B by converting the driving data dB from a digital signal to an analog signal and then applying class D amplification to the analog signal. Each of the driving signals COM_A and COM_B is input into the liquid ejecting head 41 via the wiring member 43.

Further, the driving signal output circuit 42*c* generates an offset potential VBS in addition to the driving signals COM_A and COM_B. The power supply potential GVDD is used for this generation. The offset potential VBS is a constant potential. The specific potential of the offset potential VBS is not particularly limited, and may be, for example, a constant potential of approximately 5.5 V or 6 V, or may be a ground potential. The offset potential VBS is input into the liquid ejecting head 41 via the wiring member 43. In addition, "constant potential" includes a case of being regarded as a constant potential when various fluctuations, such as potential fluctuations caused by the operation of peripheral circuits, potential fluctuations caused by circuit element variations, and potential fluctuations caused by the temperature characteristics of circuit elements, are taken into consideration.

The liquid ejecting head 41 has a restoration circuit 41*b* and head chips 41*a*_1 to 41*a*_*m*. As illustrated in FIG. 3, the liquid ejecting head 41 of the present embodiment has six head chips 41*a*. In addition, in the following, each of the head chips 41*a*_1 to 41*a*_*m* may be referred to as a head chip 41*a*.

The restoration circuit 41*b* restores the data signal DATA into a single-ended signal and separates the data signal into signals corresponding to the head chips 41*a*_1 to 41*a*_*m*.

Specifically, the restoration circuit 41*b* restores the data signal DATA to generate the print data signals SI_1 to SI_m, the latch signal LAT, the change signal ch, and the clock signal SCK. Further, the restoration circuit 41*b* separates the print data signals SI_1 to SI_m, the latch signal LAT, the change signal ch, and the clock signal SCK for each head chip 41*a*. Each signal after this separation is input into each head chip 41*a*. Here, the print data signals SI_1 to SI_m correspond to the head chips 41*a*_1 to 41*a*_*m*, respectively.

The above restoration circuit 41*b* is mounted on a relay substrate 440. The relay substrate 440 is coupled to the drive module 42 via the wiring member 43. In addition, the details of the relay substrate 440 will be described later with reference to FIG. 10.

Here, the driving signals COM_A, COM_B, the offset potential VBS, the ground potential GND, the power supply potential VHV, and the power supply potential VDD are supplied from the drive module 42 to each of the head chips 41*a*_1 to 41*a*_*m* via the relay substrate 440. Further, as described above, the print data signal SI, the latch signal LAT, the change signal CH, and the clock signal SCK are input into each of the head chips 41*a*_1 to 41*a*_*m* from the restoration circuit 41*b*.

As illustrated in FIG. 3, the liquid ejecting head 41 includes a fixing plate 470, the head chips 41*a*_1 to 41*a*_*m*, a holder 450, a relay substrate 440, and a flow path structure 460, and these are laminated in this order. The laminated parts constituting these liquid ejecting heads 41 are fixed by fixing tools such as adhesives or screws (not illustrated).

The fixing plate 470 has six opening portions 471 penetrating the fixing plate 470 in the Z2 direction. Then, the six head chips 41*a* are fixed to the surface of the fixing plate 470 facing the Z1 direction such that a nozzle substrate 413 of the head chips 41*a* is exposed from each of the six opening portions 471.

The holder 450 is positioned on the Z1 direction side of the head chip 41*a*, and accommodates the head chip 41*a* between the holder 450 and the fixing plate 470. Two introduction sections 451 and two lead-out sections 452 are provided on the surface of the holder 450 facing the Z1 direction. Each of the two introduction sections 451 communicates with a first supply flow path hole (not illustrated) formed on a surface of the holder 450 facing the Z2 direction via a holder supply path (not illustrated) formed inside the holder 450. The first supply flow path hole is coupled to a supply port H1 of the head chip 41*a* to be described later. Each of the two lead-out sections 452 communicates with a first discharge flow path hole (not illustrated) formed on a surface of the holder 450 facing the Z2 direction via a holder discharge path (not illustrated) formed inside the holder 450. The first discharge flow path hole is coupled to a discharge port H2 of the head chip 41*a* to be described later. Further, the holder 450 has six opening portions 453 penetrating along the Z1 direction. The wiring substrates 430 of each of the six head chips 41*a* are inserted into the six opening portions 453.

The relay substrate 440 is positioned in the Z1 direction of the holder 450. The relay substrate 440 has a connector 445 to which one end of the wiring member 43 for electrically coupling the drive module 42 and the liquid ejecting head 41 is coupled. Further, on the relay substrate 440, four opening portions 447 and two notch sections 448 are formed. The wiring substrate 430 of the head chip 41*a*_2 to the head chip 41*a*_5 is inserted into the four opening portions 447. The wiring substrates 430 of each of the head chip 41*a*_2 to the head chip 41*a*_5 inserted into the four opening portions 447 are electrically coupled to the relay substrate 440 by solder or the like. Further, the wiring substrate 430 of the head chip 41*a*_1 passes through one of the notch sections 448, and the wiring substrate 430 of the head chip 41*a*_6 passes through the other one of the notch sections 448. Then, the wiring substrate 430 included in each of the head chips 41*a*_1 and 41*a*_6, through which each of the two notch sections 448 pass, is electrically coupled to the relay substrate 440 by solder or the like.

The flow path structure 460 has two introduction sections 461 and two lead-out sections 462 protruding in the Z1 direction on a surface facing the Z1 direction. Each of the two introduction sections 461 communicates with a second supply flow path hole (not illustrated) formed on a surface of the flow path structure 460 facing the Z2 direction via a flow path (not illustrated) formed inside the flow path structure 460. The second supply flow path hole is coupled to the introduction section 451 of the holder 450. The supply flow path 53 formed of, for example, a tube is coupled to the two introduction sections 461. Further, each of the two lead-out sections 472 communicates with a second discharge flow path hole (not illustrated) formed on a surface of the flow path structure 460 facing the Z2 direction via a flow path (not illustrated) formed inside the flow path structure 460. The second discharge flow path hole is coupled to the lead-out section 452 of the holder 450. The collecting flow path 54 formed by, for example, a tube is coupled to the two lead-out sections 462.

Furthermore, the flow path structure 460 is formed with a through-hole 463 that penetrates along the Z1 direction. The wiring member 43 electrically coupled to the relay substrate 440 is inserted through the through-hole 463. In addition, a filter or the like may be provided inside the flow path structure 460 to capture foreign matter contained in the ink flowing through the flow path formed inside the flow path structure 460.

Each of the head chips 41*a*_1 to 41*a*_*m* has driving circuits 410_1 to 410_*m* for driving the piezoelectric element 400 (piezoelectric body). Hereinafter, the driving circuit 410 will be described. The details of the head chip 41*a* will be described with reference to FIGS. 5 to 8 to be described later. Further, in the following, each of the driving circuits 410_1 to 410_*m* may be referred to as a driving circuit 410.

The driving circuit 410 has a plurality of switching elements 410*sw* that switch whether to supply each of the driving signals COM_A and COM_B to the piezoelectric element 400 based on the clock signal SCK, the print data signal SI, the change signal CH, and the latch signal LAT. Here, among the waveforms included in the driving signals COM_A and COM_B, the waveform actually supplied to the piezoelectric element 400 is a driving signal VOUT. Further, of the pair of electrodes of the piezoelectric element 400, the driving signal VOUT is supplied to one electrode (an individual electrode 401 to be described later), and the offset potential VBS is supplied to the other electrode (a common electrode 403 to be described later). In addition, an example of the change signal CH, the latch signal LAT, and the driving signals COM_A and COM_B will be described later with reference to FIG. 4.

The above driving circuit 410 is mounted on the wiring substrate 430. The wiring substrate 430 electrically couples the plurality of piezoelectric elements 400 and the relay substrate 440. In addition, the details of the wiring substrate 430 will be described later with reference to FIG. 8.

As described above, the liquid ejecting apparatus 100 includes the liquid ejecting head 41 and the wiring member 43 coupled to the liquid ejecting head 41. Here, as described above, the liquid ejecting head 41 includes at least one head chip 41*a* and the relay substrate 440 coupled to the head chip 41*a*.

1-3. Operation of Driving Circuit 410

Figure 4:
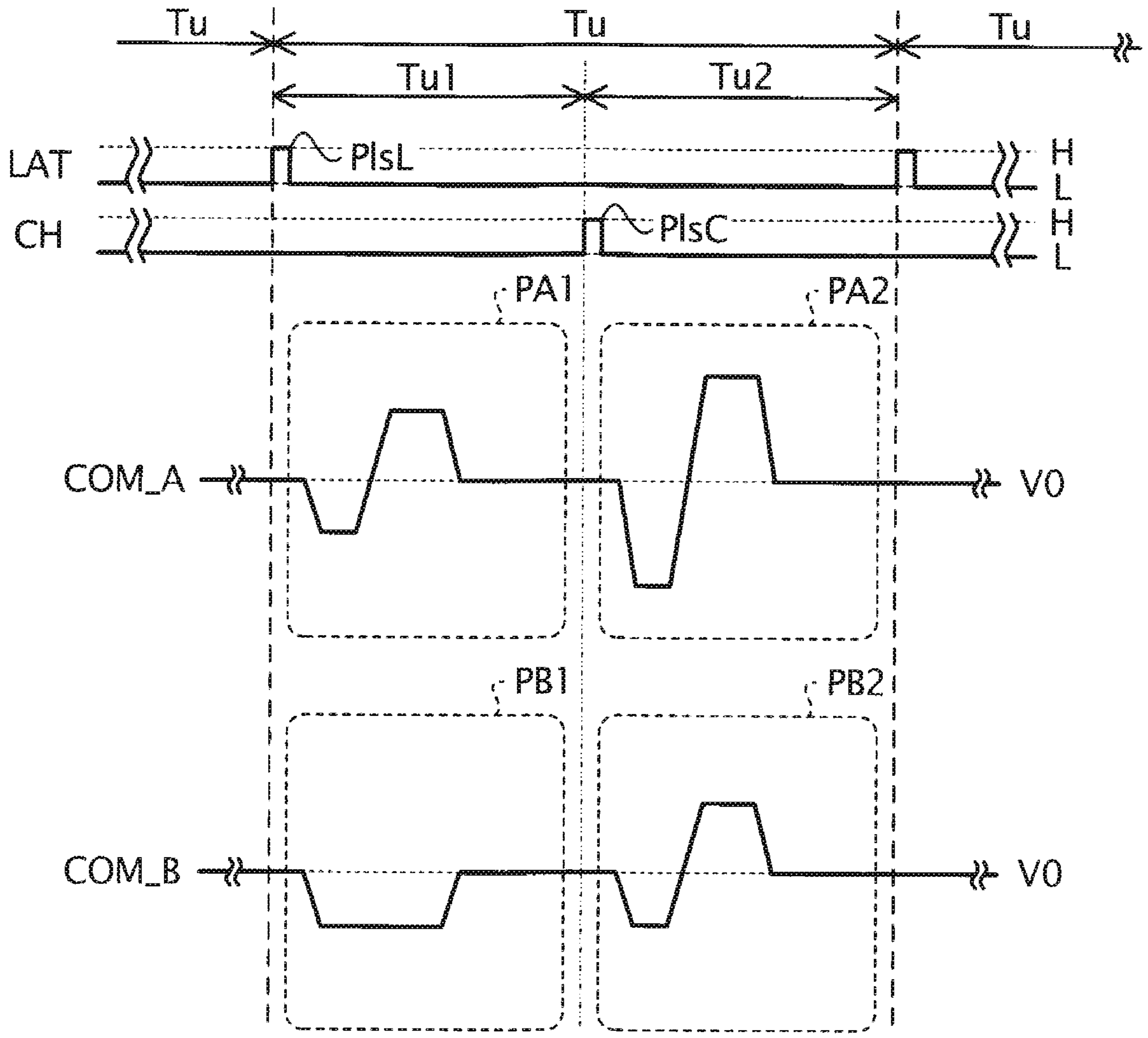
FIG. 4 is a view for explaining an operation of a driving circuit.

FIG. 4 is a view for explaining an operation of the driving circuit 410. As illustrated in FIG. 4, the latch signal LAT includes a pulse PlsL for defining a unit period Tu. In the example illustrated in FIG. 4, the unit period Tu is defined as a period from the rise of the pulse PlsL to the rise of the next pulse PlsL. The unit period Tu corresponds to a printing cycle in which dots are formed on the medium M by ink from nozzle N. That is, the unit period Tu corresponds to the control cycle of the driving circuit 410 to be described above.

The change signal CH includes the pulse PlsC for dividing the unit period Tu into a control period Tu1 and a control period Tu2. The control period Tu1 and the control period Tu2 are arranged in this order over time. The control period Tu1 is, for example, a period from the rise of the pulse PlsL to the rise of the first pulse PlsC. The control period Tu2 is, for example, a period from the rise of the first pulse PlsC to the rise of the subsequent second pulse PlsC. In addition, in the example illustrated in FIG. 4, the control period Tu1 and the control period Tu2 have the same time length, but are not limited thereto, and the control period Tu1 and the control period Tu2 may have different time lengths. Further, the change signal CH may divide the unit period into three or more control periods.

The driving signal COM_A has a pulse PA1 provided in the control period Tu1 and a pulse PA2 provided in the control period Tu2. The driving signal COM_B has a pulse PB1 provided in the control period Tu1 and a pulse PB2 provided in the control period Tu2.

In the example illustrated in FIG. 4, each of the pulses PA1, PA2, and PB2 is potential pulses for driving the piezoelectric element 400 such that the pressure fluctuation of the strength of ejecting ink from the nozzle N to be described later is generated in the pressure chambers Ca and Cb to be described later. On the other hand, the pulse PB1 is a potential pulse for driving the piezoelectric element 400 such that a pressure fluctuation having a strength that does not eject ink from the nozzle N to be described later is generated in the pressure chambers Ca and Cb to be described later. In addition, the waveforms of the pulses PA1, PA2, PB1, and PB2 are not limited to the example illustrated in FIG. 4, and are any waveforms. Further, the pulse PB1 may be a potential pulse for driving the piezoelectric element 400 such that a pressure fluctuation having a strength that ejects ink from the nozzle N to be described later is generated in the pressure chambers Ca and Cb to be described later.

The above pulses PA1, PA2, PB1, and PB2 are appropriately selected for each unit period Tu and used for the driving signal VOUT. As a result, the amount of ink ejected from the nozzle N can be adjusted, and the ink in the nozzle N can be slightly vibrated without ejecting the ink from the nozzle N.

1-4. Head Chip

Figure 5:
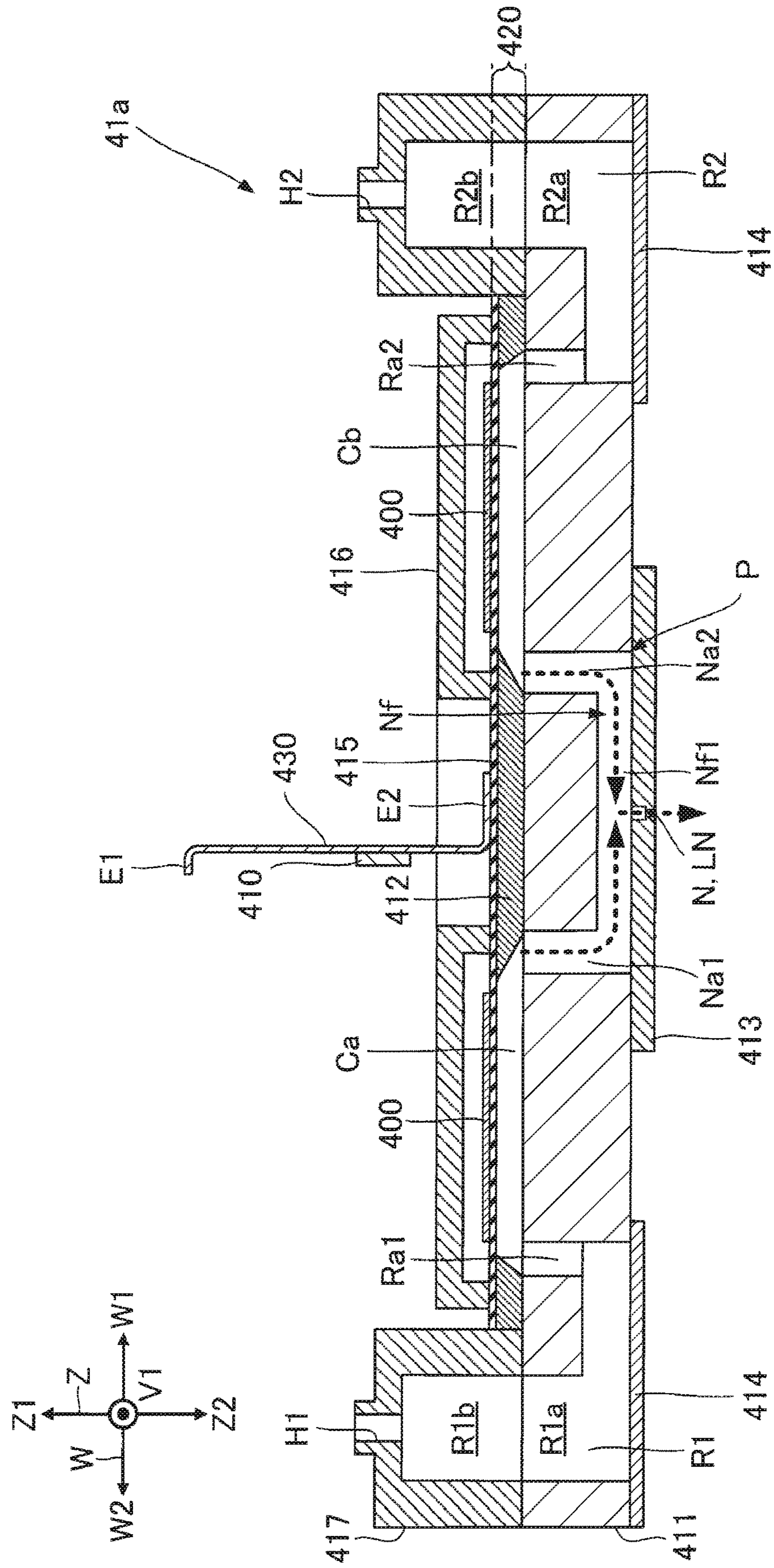
FIG. 5 is a sectional view of a head chip according to the first embodiment.

FIG. 5 is a sectional view of the head chip 41*a* according to the first embodiment. In the following description, for convenience, in addition to the X axis, the Y axis, and the Z axis, a V axis and a W axis are appropriately used. Further, one direction along the V axis is the V1 direction, and the direction opposite to the V1 direction is a V2 direction. Similarly, the directions opposite to each other along the W axis are a W1 direction and a W2 direction.

Here, the V axis is an axis along a nozzle array direction DN, which is the arrangement direction of the plurality of nozzles N described later, and is an axis obtained by rotating the Y axis around the Z axis at a predetermined angle. The W axis is an axis obtained by rotating the X axis around the Z axis at the predetermined angle. Therefore, the V axis and the W axis are typically orthogonal to each other, but are not limited thereto, and may intersect each other at an angle within the range of 80° or more and 100° or less, for example. Further, the predetermined angle, that is, the angle formed by the V axis and the Y axis, or the angle formed by the W axis and the X axis is, for example, within the range of 40° or more and 60° or less.

As illustrated in FIG. 5, the head chip 41*a* includes a flow path substrate 411, a pressure chamber substrate 412, a nozzle substrate 413, a vibration absorbing body 414, a vibrating plate 415, a cover 416, a case 417, a plurality of piezoelectric elements 400, and a wiring substrate 430. Here, the pressure chamber substrate 412 and the vibrating plate 415 constitute an actuator substrate 420 on which a plurality of piezoelectric elements 400 are mounted.

The flow path substrate 411 and the pressure chamber substrate 412 are laminated in the Z1 direction in this order, and form a plurality of individual flow paths P for supplying ink to the plurality of nozzles N. The plurality of individual flow paths P are arranged in a direction along the V axis. Each of the plurality of individual flow paths P communicates with different nozzles N, and has the pressure chamber Ca, the pressure chamber Cb, a nozzle flow path Nf, a supply flow path Ra1, a discharge flow path Ra2, a first vertical flow path Na1, and a second vertical flow path Na2. In the following, each of the pressure chambers Ca and Cb may be referred to as a pressure chamber C.

The vibrating plate 415, the plurality of piezoelectric elements 400, the covers 416 and 417, and the wiring substrate 430 are installed in a region positioned in the Z1 direction with respect to the laminated body composed of the flow path substrate 411 and the pressure chamber substrate 412. On the other hand, the nozzle substrate 413 and the vibration absorbing body 414 are installed in the region positioned in the Z2 direction with respect to the laminated body. Each element of the head chip 41*a* is generally a plate-shaped member elongated in the direction along the V axis, and is joined to each other by, for example, an adhesive. A plurality of nozzles N are provided on the nozzle substrate 413. The plurality of nozzles N are arranged in a direction along the V axis (the nozzle array direction DN to be described later). Each of the plurality of nozzles N penetrates the nozzle substrate 413 and is a through-hole through which ink passes.

The pressure chamber substrate 412 is provided with the plurality of pressure chambers Ca and the plurality of pressure chambers Cb. The plurality of pressure chambers Ca are arranged in a direction along the V axis. The plurality of pressure chambers Cb are arranged in the direction along the V axis at positions in the W1 direction with respect to the plurality of pressure chambers Ca. Here, the pressure chambers Ca and Cb corresponding to the common nozzle N are arranged in a direction along the W axis, and the nozzle N is arranged between the pressure chamber Ca and the pressure chamber Cb corresponding to the common nozzle N when viewed in the Z2 direction which is the ejection direction of the ink from the nozzle N. Each of the pressure chamber Ca and the pressure chamber Cb penetrates the pressure chamber substrate 412 and is a gap between the flow path substrate 411 and the vibrating plate 415.

The flow path substrate 411 is provided with spaces R1*a* and R2*a*, the nozzle flow path Nf, the supply flow path Ra1, and the discharge flow path Ra2.

Each of the spaces R1*a* and R2*a* is a space that penetrates the flow path substrate 411 in the direction along the Z axis. Here, the space R1*a* constitutes a part of a first common liquid chamber R1. Further, the space R2*a* constitutes a part of a second common liquid chamber R2. The vibration absorbing body 414 that closes the opening by the spaces R1*a* and R2*a* is installed on the surface of the flow path substrate 411 facing the Z2 direction.

The vibration absorbing body 414 is a layered member made of an elastic material. The vibration absorbing body 414 forms a part of the wall surface of the first common liquid chamber R1 and the second common liquid chamber R2, and absorbs the pressure fluctuation in the first common liquid chamber R1 and the second common liquid chamber R2.

The nozzle flow path Nf is a space in which the pressure chamber Ca and the pressure chamber Cb communicate with each other. In the example illustrated in FIG. 5, the nozzle flow path Nf has a horizontal flow path Nf1, the first vertical flow path Na1, and the second vertical flow path Na2. The horizontal flow path Nf1 is a space in the groove provided on the surface of the flow path substrate 411 facing the Z2 direction. Here, the nozzle substrate 413 constitutes a part of the wall surface of the horizontal flow path Nf1. Each of the first vertical flow path Na1 and the second vertical flow path Na2 is a space extending along the Z axis and penetrating the flow path substrate 411. The first vertical flow path Na1 allows the pressure chamber Ca to communicate with the horizontal flow path Nf1 and guides the ink from the pressure chamber Ca to the horizontal flow path Nf1. On the other hand, the second vertical flow path Na2 allows the pressure chamber Cb to communicate with the horizontal flow path Nf1 and guides the ink from the horizontal flow path Nf1 to the pressure chamber Cb.

Each of the supply flow path Ra1 and the discharge flow path Ra2 is a space extending along the Z axis and penetrating the flow path substrate 411. The supply flow path Ra1 allows the first common liquid chamber R1 to communicate with the pressure chamber Ca, and supplies the ink from the first common liquid chamber R1 to the pressure chamber Ca. Here, one end of the supply flow path Ra1 is opened on the surface of the flow path substrate 411 facing the Z1 direction. On the other hand, the other end of the supply flow path Ra1 is an upstream end of the individual flow path P and opens to the wall surface of the first common liquid chamber R1 on the flow path substrate 411. On the other hand, the discharge flow path Ra2 allows the second common liquid chamber R2 to communicate with the pressure chamber Cb, and discharges the ink from the pressure chamber Cb to the second common liquid chamber R2. Here, one end of the discharge flow path Ra2 is opened on the surface of the flow path substrate 411 facing the Z1 direction. On the other hand, the other end of the discharge flow path Ra2 is the downstream end of the individual flow path P, and opens to the wall surface of the second common liquid chamber R2 on the flow path substrate 411.

The vibrating plate 415 is a plate-shaped member that can elastically vibrate. The details of the vibrating plate 415 will be described later with reference to FIG. 6.

A plurality of piezoelectric elements 400 corresponding to different pressure chambers C are installed on the surface of the vibrating plate 415 facing the Z1 direction. The piezoelectric element 400 overlaps the corresponding pressure chamber C in plan view. When the driving signal VOUT is supplied, the piezoelectric element 400 vibrates the vibrating plate 415 with its own deformation. Along with this vibration, the pressure chamber C expands and contracts such that the pressure of the ink in the pressure chamber C fluctuates.

The case 417 is a case for storing ink. Spaces R1*b* and R2*b* are provided in the case 417. The space R1*b* and the above-described space R1*a* form the first common liquid chamber R1. Further, the space R2*b* and the above-described space R2*a* form the second common liquid chamber R2. Further, the case 417 is provided with the supply port H1 and the discharge port H2. The supply port H1 is a conduit that communicates with the first common liquid chamber R1 and is coupled to the supply flow path 53 of the circulation mechanism 50 described above via the holder 450 and the flow path of the flow path structure 460 described above. Therefore, the ink from the circulation mechanism 50 is supplied to the first common liquid chamber R1 via the supply port H1. On the other hand, the discharge port H2 is a conduit that communicates with the second common liquid chamber R2 and is coupled to the collecting flow path 54 of the circulation mechanism 50 via the holder 450 and the flow path of the flow path structure 460 described above. Therefore, the ink in the second common liquid chamber R2 is discharged to the circulation mechanism 50 via the discharge port H2.

The cover 416 is a plate-shaped member installed on the surface of the vibrating plate 415 facing the Z1 direction, protects a plurality of piezoelectric elements 400, and reinforces the mechanical strength of the vibrating plate 415. Here, a space for accommodating the plurality of piezoelectric elements 400 is formed between the cover 416 and the vibrating plate 415.

The wiring substrate 430 is mounted on a surface of the vibrating plate 415 facing the Z1 direction, and is a flexible wiring substrate such as a flexible printed circuit (FPC) or a flexible flat cable (FFC). The driving circuit 410 described above is mounted on the wiring substrate 430.

In the head chip 41*a* having the above configuration, the ink is transferred to the first common liquid chamber R1, the supply flow path Ra1, the pressure chamber Ca, the nozzle flow path Nf, the pressure chamber Cb, the discharge flow path Ra2, and the second common liquid chamber R2 by the operation of the circulation mechanism 50 described above. In addition, the operation period or operation timing of the circulation mechanism 50 is any period or timing.

Further, the pressure of the pressure chamber Ca and the pressure chamber Cb is caused to fluctuate by simultaneously driving the piezoelectric element 400 corresponding to both the pressure chamber Ca and the pressure chamber Cb communicating with the common nozzle N by the driving signal VOUT from the driving circuit 410, and the ink is ejected from the nozzle N as the pressure fluctuates. In FIG. 5, the flow of ink when the piezoelectric element 400 corresponding to both the pressure chamber Ca and the pressure chamber Cb is driven at the same time is indicated by a broken line arrow.

1-5. Piezoelectric Element and Actuator Substrate

Figure 6:
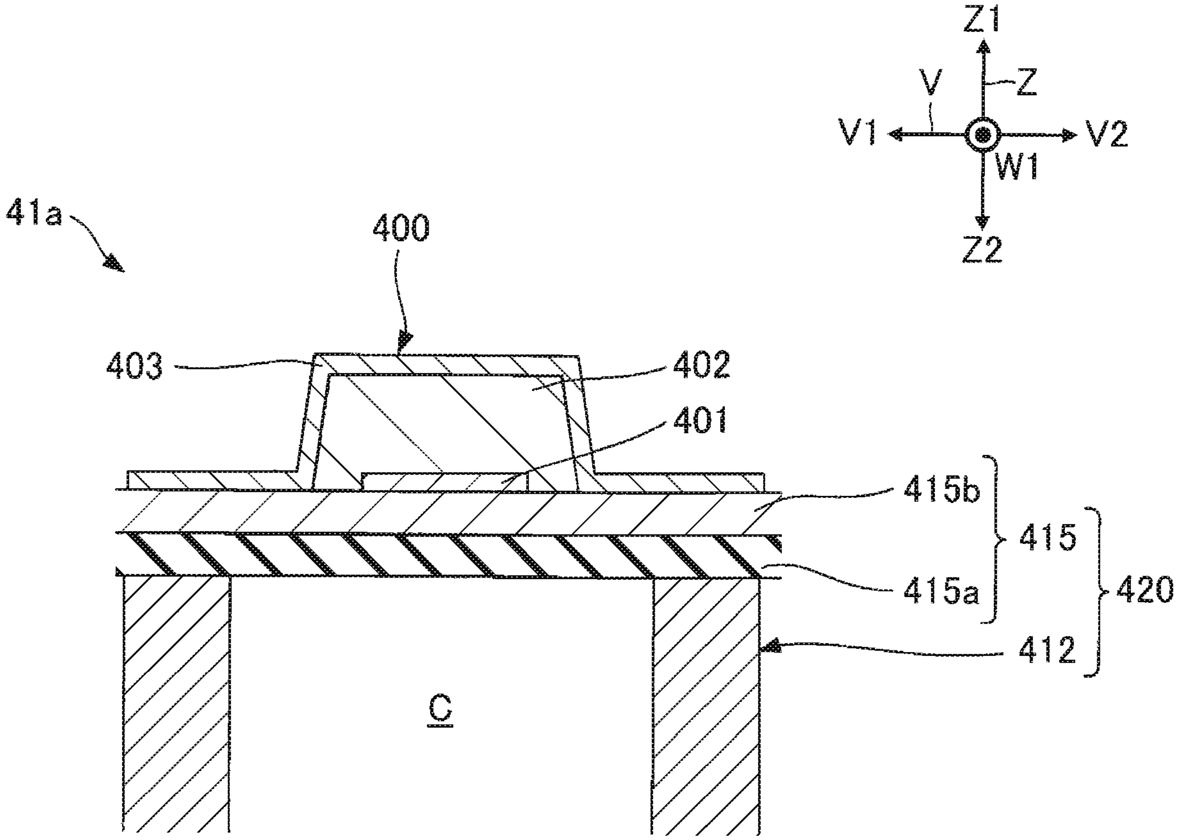
FIG. 6 is a sectional view of a piezoelectric element.

FIG. 6 is a sectional view of the piezoelectric element 400. As described above, the actuator substrate 420 includes the pressure chamber substrate 412 having the pressure chamber C and the vibrating plate 415. The piezoelectric elements 400 are arranged for each pressure chamber C on the surface of the actuator substrate 420 facing the Z1 direction. The vibrating plate 415 is laminated on the pressure chamber substrate 412.

Here, in the example illustrated in FIG. 6, the vibrating plate 415 has a first layer 415*a* and a second layer 415*b*, and these are laminated in the Z1 direction in this order. The first layer 415*a* is, for example, an elastic film made of silicon oxide ($SiO_2$). The elastic film is formed, for example, by thermally oxidizing one surface of a silicon single crystal substrate. The second layer 415*b* is, for example, an insulating film made of zirconium oxide ($ZrO_2$). The insulating film is formed by, for example, forming a zirconium layer by a sputtering method and thermally oxidizing the layer.

In addition, the first layer 415*a* is not limited to silicon oxide, and may be made of, for example, another elastic material such as elemental silicon. The constituent material of the second layer 415*b* is not limited to zirconium oxide, and may be another insulating material such as silicon nitride. Further, another layer such as a metal oxide may be interposed between the first layer 415*a* and the second layer 415*b*. Further, a part or all of the vibrating plate 415 may be integrally made of the same material as the pressure chamber substrate 412. Further, the vibrating plate 415 may be composed of a layer of a single material.

In addition, the vibrating plate 415 or at least a part of the vibrating plate 415 (for example, the second layer 415*b*)

may be integrally formed with the pressure chamber substrate 412. That is, in the present specification, the case where "the vibrating plate 415 is laminated on the pressure chamber substrate 412" include not only a case where the vibrating plate 415 or a part of the vibrating plate 415 is laminated on the pressure chamber substrate 412 which is a material different from the vibrating plate 415 or a part of the vibrating plate 415 and is fixed to the pressure chamber substrate 412, but also a case where the vibrating plate 415 or a part of the vibrating plate 415 is integrally made of the same material as the pressure chamber substrate 412.

The piezoelectric element 400 has the individual electrode 401, a piezoelectric body 402, and the common electrode 403, and these are laminated in the Z1 direction in this order.

It should be noted that another layer such as a layer for enhancing adhesion may be appropriately interposed between the layers of the piezoelectric element 400 or between the piezoelectric element 400 and the vibrating plate 415. Further, a seed layer may be provided between the individual electrode 401 and the piezoelectric body 402. The seed layer has a function of improving the orientation of the piezoelectric body 402 when forming the piezoelectric body 402. The seed layer is made of, for example, titanium (Ti) or a composite oxide having a perovskite structure such as $Pb(Fe,Ti)O_3$.

The individual electrode 401 is an individual electrode mounted on the actuator substrate 420 and arranged apart from each other for each piezoelectric element 400. The driving signal VOUT is supplied to the individual electrode 401. The individual electrode 401 has, for example, a first layer made of titanium (Ti), a second layer made of platinum (Pt), and a third layer made of iridium (Ir), and these are laminated in the Z1 direction in this order. The individual electrode 401 is formed by, for example, a known film forming technique such as a sputtering method, and a known processing technique using photolithography, etching, or the like.

Further, the configuration of the individual electrode 401 is not limited to the above-described example. For example, either the above-described second layer or third layer may be omitted, or a layer made of iridium may be further provided between the above-described first layer and second layer. Further, instead of the second layer and the third layer, or in addition to the second layer and the third layer, a layer made of an electrode material other than iridium and platinum may be used. Examples of the electrode material include metal materials such as aluminum (Al), nickel (Ni), gold (Au), and copper (Cu). Among these, one of these may be used alone, and two or more types may be used in combination in the form of a laminate or an alloy or the like.

The piezoelectric body 402 is arranged between the individual electrode 401 and the common electrode 403. In the example illustrated in FIG. 6, the piezoelectric body 402 is individually provided for each piezoelectric element 400. Further, the piezoelectric body 402 may be provided in common with the plurality of piezoelectric elements 400. In this case, the piezoelectric body 402 forms a strip extending in the direction along the Y axis to be continuous over the plurality of piezoelectric elements 400.

The piezoelectric body 402 is made of a piezoelectric material having a perovskite-type crystal structure represented by the general composition formula $ABO_3$. Specific examples of the piezoelectric material include lead titanate ($PbTiO_3$), lead zirconate titanate ($Pb(Zr,Ti)O_3$), lead zirconate ($PbZrO_3$), lead lanthanum titanate ($(Pb,La),TiO_3$), lead lanthanum zirconate titanate ($(Pb,La)(Zr,Ti)O_3$), lead niobate zirconate titanate ($Pb(Zr,Ti,Nb)O_3$), and lead magnesium niobate zirconate titanate ($Pb(Zr,Ti)(Mg,Nb)O_3$). Among them, lead zirconate titanate is preferably used as a constituent material of the piezoelectric body 402. The piezoelectric body 402 may contain a small amount of other elements such as impurities.

The piezoelectric body 402 is formed by forming a precursor layer of the piezoelectric body by, for example, a liquid phase method such as a sol-gel method or a metal organic decomposition (MOD) method, and firing and crystallizing the precursor layer. Here, the piezoelectric body 402 may be composed of a single layer, but when it is composed of a plurality of layers, there is an advantage that the characteristics of the piezoelectric body 402 can be easily improved even when the thickness of the piezoelectric body 402 is increased.

The common electrode 403 is a band-shaped common electrode extending in the direction along the Y axis to be continuous over the plurality of piezoelectric elements 400. The offset potential VBS is applied to the common electrode 403. Here, as will be described later with reference to FIG. 7, the common electrode 403 is independent of the piezoelectric element 400 corresponding to the pressure chamber Ca and the piezoelectric element 400 corresponding to the pressure chamber Cb.

The common electrode 403 is made of, for example, a metal such as iridium (Ir), titanium (Ti), platinum (Pt), aluminum (Al), nickel (Ni), gold (Au), or copper (Cu), or an alloy containing these metals or a conductive oxide. The common electrode 403 is formed by, for example, a known film forming technique such as a sputtering method, and a known processing technique using photolithography, etching, or the like. In addition, the common electrode 403 may be composed of a plurality of layers.

Figure 7:
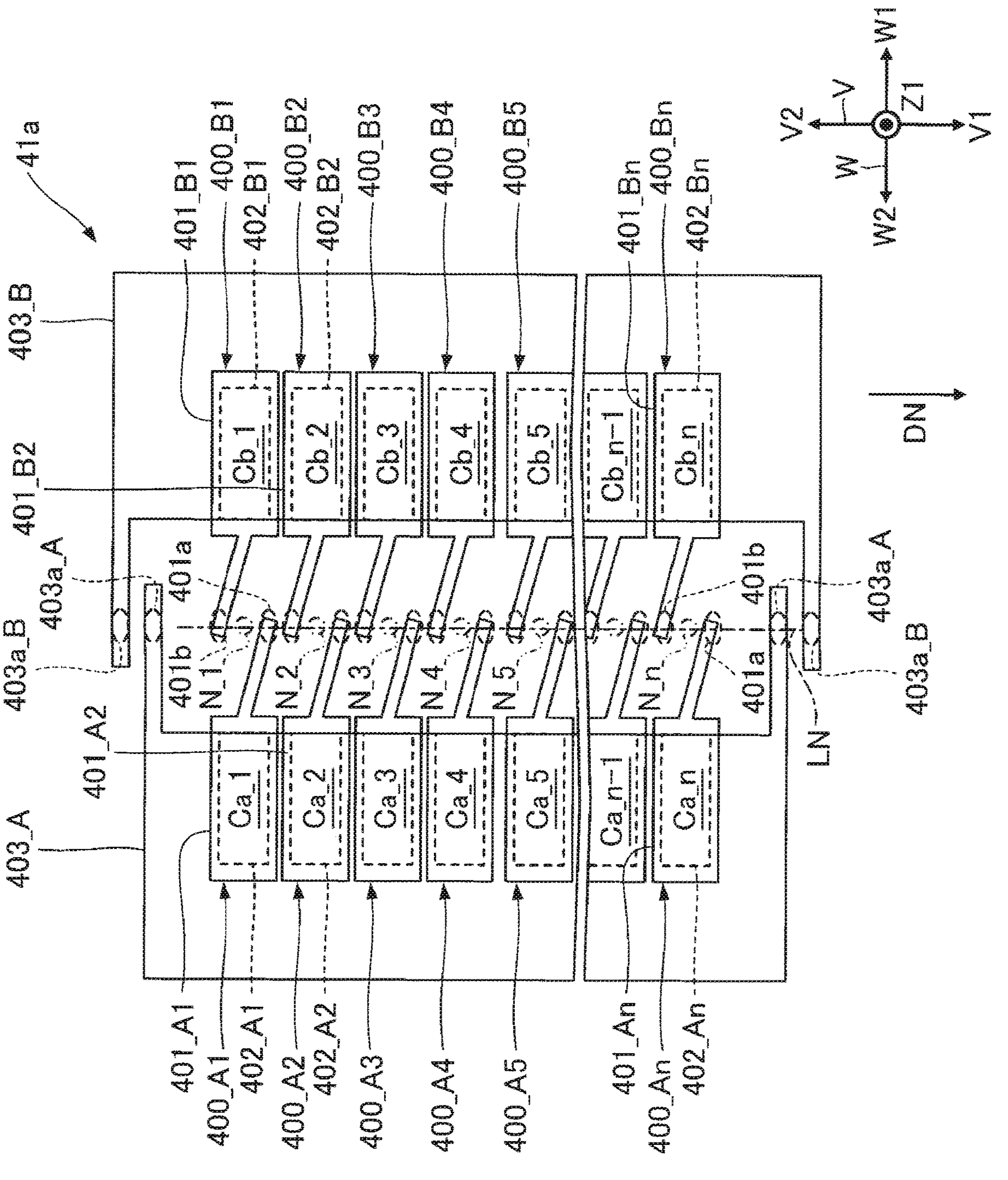
FIG. 7 is a schematic plan view for explaining the piezoelectric element according to the first embodiment.

FIG. 7 is a schematic plan view for explaining the piezoelectric element 400 according to the first embodiment. In FIG. 7, n nozzles N are illustrated as nozzles N_1 to N_n, the pressure chambers Ca corresponding to the nozzles N_1 to N_n are illustrated as pressure chambers Ca_1 to Ca_n, and the pressure chambers Cb corresponding to the nozzles N_1 to N_n are illustrated as pressure chambers Cb_1 to Cb_n. n is a natural number of 2 or more, and is not particularly limited, but is, for example, in the range of 200 or more and 600 or less. Here, the nozzles N_1 to N_n are arranged in the nozzle array direction DN along the V axis, and form a nozzle array LN. Further, in FIG. 7, a plurality of individual electrodes 401, a plurality of common electrodes 403, and a plurality of piezoelectric bodies 402 arranged on the actuator substrate 420 are illustrated.

As illustrated in FIG. 7, the head chip 41*a* has individual electrodes 401_A1 to 401_An, individual electrodes 401_B1 to 401_Bn, piezoelectric bodies 402_A1 to 402_An, piezoelectric bodies 402_B1 to 402_Bn, a first common electrode 403_A, and a second common electrode 403_B.

The individual electrodes 401_A1 to 401_An are individual electrodes 401 corresponding to the pressure chambers Ca_1 to Ca_n, respectively. Similarly, the individual electrodes 401_B1 to 401_Bn are individual electrodes 401 corresponding to the pressure chambers Cb_1 to Cb_n, respectively.

In the present embodiment, the individual electrodes 401_A1 to 401_An and the individual electrodes 401_B1 to 401_Bn are independent on the actuator substrate 420. Here, each of the individual electrodes 401_A1 to 401_An has a terminal section 401*a* for coupling with the wiring substrate 430. Each of the individual electrodes 401_B1 to 401_Bn has a terminal section 401*b* for coupling with the wiring substrate 430. The terminal sections 401*a* and 401*b* are arranged in the nozzle array direction DN. In the example illustrated in FIG. 7, each of the nozzles N_1 to N_n is arranged between the corresponding terminal section 401*a* and the terminal section 401*b* in plan view.

The piezoelectric bodies 402_A1 to 402_An are piezoelectric bodies 402 corresponding to the pressure chambers Ca_1 to Ca_n, respectively. Therefore, the corresponding individual electrodes 401_A1 to 401_An are coupled to the piezoelectric bodies 402_A1 to 402_An. Similarly, the piezoelectric bodies 402_B1 to 402_Bn are piezoelectric bodies 402 corresponding to the pressure chambers Cb_1 to Cb_n, respectively. Therefore, the corresponding individual electrodes 401_B1 to 401_Bn are coupled to the piezoelectric bodies 402_B1 to 402_Bn.

The first common electrode 403_A is the common electrode 403 corresponding to the pressure chambers Ca_1 to Ca_n. Therefore, the first common electrode 403_A is commonly coupled to the piezoelectric bodies 402_A1 to 402_An. Here, the piezoelectric bodies 402_A1 to 402_An are located between the individual electrodes 401_A1 to 401_An and the first common electrode 403_A. Similarly, the second common electrode 403_B is the common electrode 403 corresponding to the pressure chambers Cb_1 to Cb_n. Therefore, the second common electrode 403_B is commonly coupled to the piezoelectric bodies 402_B1 to 402_Bn. Here, the piezoelectric bodies 402_B1 to 402_Bn are located between the individual electrodes 401_B1 to 401_Bn and the second common electrode 403_B.

The first common electrode 403_A and the second common electrode 403_B are independent on the actuator substrate 420. That is, the first common electrode 403_A and the second common electrode 403_B are arranged on the actuator substrate 420 at intervals from each other.

Here, the first common electrode 403_A has two terminal sections 403*a*_A for coupling with the wiring substrate 430. The two terminal sections 403*a*_A are arranged at or near both ends of the first common electrode 403_A in the nozzle array direction DN, and are arranged in the nozzle array direction DN on the same straight line as the plurality of terminal sections 401*a* and the plurality of terminal sections 401*b* described above.

Similarly, the second common electrode 403_B has two terminal sections 403*a*_B for coupling with the wiring substrate 430. The two terminal sections 403*a*_B are arranged at or near both ends of the second common electrode 403_B in the nozzle array direction DN, and are arranged in the nozzle array direction DN on the same straight line as the plurality of terminal sections 401*a* and the plurality of terminal sections 401*b* described above. In the example illustrated in FIG. 7, the above-described two terminal sections 403*a*_A are arranged between the two terminal sections 403*a*_B.

The piezoelectric elements 400_A1 to 400_An are configured by the above individual electrodes 401_A1 to 401_An, the piezoelectric bodies 402_A1 to 402_An, and the first common electrode 403_A. The piezoelectric elements 400_A1 to 400_An are piezoelectric elements 400 corresponding to the pressure chambers Ca_1 to Ca_n. Similarly, the piezoelectric elements 400_B1 to 400_Bn are configured by the individual electrodes 401_B1 to 401_Bn, the piezoelectric bodies 402_B1 to 402_Bn, and the second common electrode 403_B. The piezoelectric elements 400_B1 to 400_Bn are piezoelectric elements 400 corresponding to the pressure chambers Cb_1 to Cb_n.

Here, of the two nozzles N selected from the nozzles N_1 to N_n in any manner, one is the "first nozzle" and the other is the "second nozzle". Of the pressure chambers Ca and Cb communicating with the first nozzle, one is a "first pressure chamber" and the other is a "second pressure chamber". Of the pressure chambers Ca and Cb communicating with the second nozzle, one is a "third pressure chamber" and the other is a "fourth pressure chamber". However, in the following, for convenience of explanation, the nozzle N_1 is referred to as a "first nozzle", the nozzle N_2 is referred to as a "second nozzle", the pressure chamber Ca_1 is referred to as a "first pressure chamber", the pressure chamber Cb_1 is referred to as a "second pressure chamber", the pressure chamber Ca_2 is referred to as a "third pressure chamber", and the pressure chamber Cb_2 is referred to as a "fourth pressure chamber".

1-6. Wiring Substrate

Figure 8:
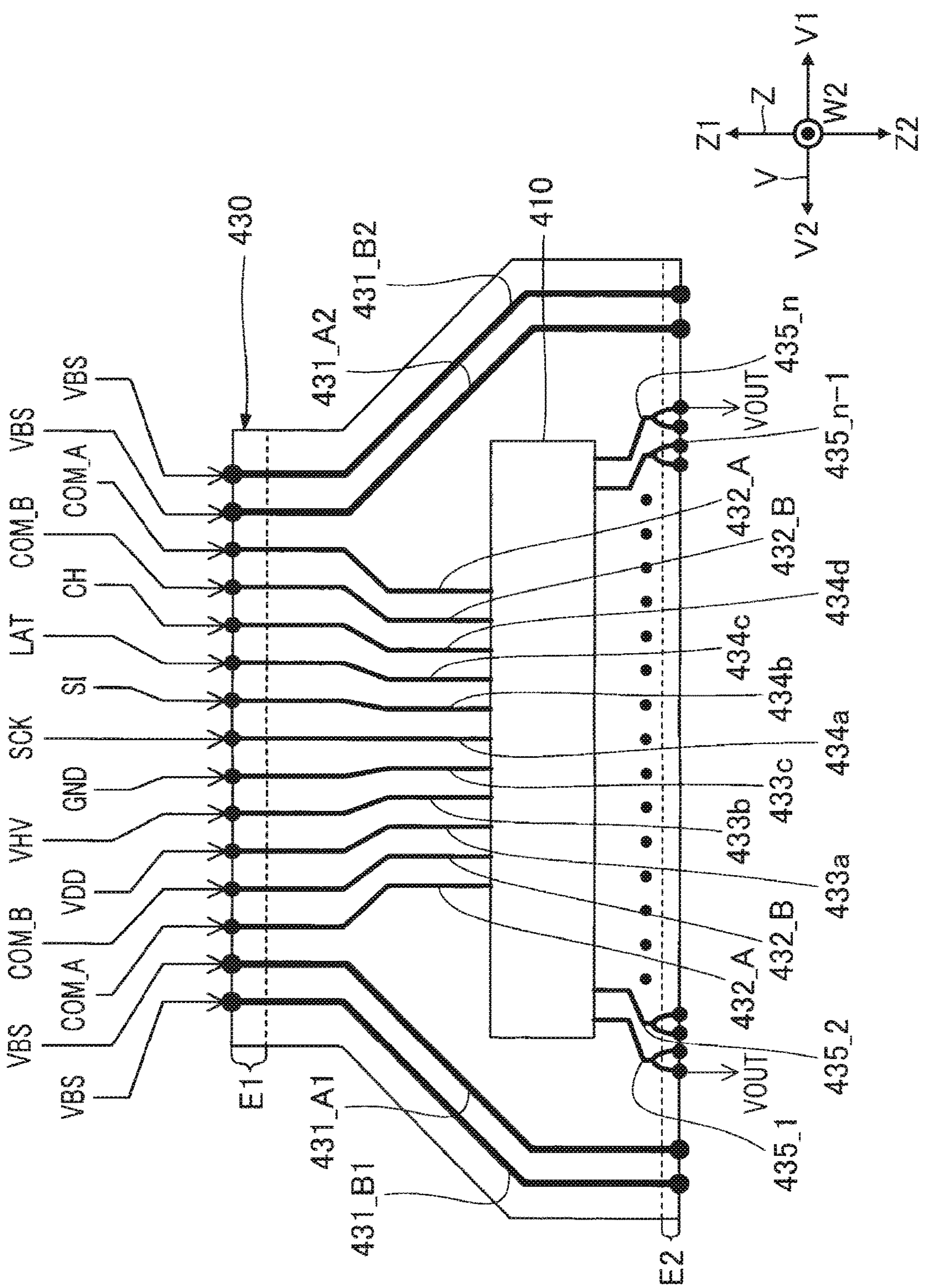
FIG. 8 is a schematic diagram for explaining a wiring substrate according to the first embodiment.

FIG. 8 is a schematic diagram for explaining the wiring substrate 430 according to the first embodiment. As illustrated in FIG. 8, the wiring substrate 430 includes a first common wiring 431_A1, a second common wiring 431_B1, a third common wiring 431_A2, a fourth common wiring 431_B2, two signal lines 432_A, two signal lines 432_B, wirings 433*a*, 433*b*, 433*c*, 434*a*, 434*b*, 434*c*, and 434*d*, and individual wirings 435_1 to 435_*n*.

Here, the wiring substrate 430 has a first end E1 and a second end E2 facing in the direction opposite to the first end E1. The first end E1 is an end coupled to the relay substrate 440. The second end E2 is an end coupled to the actuator substrate 420. As illustrated in FIG. 5, the wiring substrate 430 of the present embodiment is bent such that the first end E1 and the second end E2 are respectively along a plane perpendicular to the direction along the Z axis. In the example illustrated in FIG. 8, the length of the first end E1 is shorter than the length of the second end E2. Further, the driving circuit 410 is mounted on the wiring substrate 430 as described above.

The first common wiring 431_A1, the second common wiring 431_B1, the third common wiring 431_A2, and the fourth common wiring 431_B2 are wirings for transmitting the offset potential VBS, respectively. The first common wiring 431_A1, the second common wiring 431_B1, the third common wiring 431_A2, and the fourth common wiring 431_B2 are each provided from the first end E1 to the second end E2 without passing through the driving circuit 410.

Here, when viewed in the thickness direction of the wiring substrate 430, that is, in the direction along the W axis, the driving circuit 410 is arranged between the first common wiring 431_A1 and the second common wiring 431_B1 and the third common wiring 431_A2 and the fourth common wiring 431_B2. In the example illustrated in FIG. 8, the first common wiring 431_A1 and the second common wiring 431_B1 are arranged on the left side part of the wiring substrate 430 in FIG. 8, and the third common wiring 431_A2 and the fourth common wiring 431_B2 are arranged on the right side part of the wiring substrate 430 in FIG. 8. Further, the first common wiring 431_A1 and the third common wiring 431_A2 are arranged between the second common wiring 431_B1 and the fourth common wiring 431_B2.

Each of the first common wiring 431_A1 and the third common wiring 431_A2 is coupled to the two terminal sections 403*a*_A of the actuator substrate 420 described above at the second end E2. Specifically, of the two terminal sections 403*a*_A, the first common wiring 431_A1 is coupled to one of these, and the third common wiring 431_A2 is coupled to the other one of these. Therefore, the offset potential VBS, which is a constant potential, is supplied to the first common electrode 403_A via the first common wiring 431_A1 and the third common wiring 431_A2. As described above, each of the first common wiring 431_A1 and the third common wiring 431_A2 electrically couples the outside of the wiring substrate 430 and the first common electrode 403_A without going through the driving circuit 410.

On the other hand, each of the second common wiring 431_B1 and the fourth common wiring 431_B2 is coupled to the two terminal sections 403*a*_B of the above-described actuator substrate 420 at the second end E2. Specifically, of the two terminal sections 403*a*_B, the second common wiring 431_B1 is coupled to one of these, and the fourth common wiring 431_B2 is coupled to the other one of these. Therefore, the offset potential VBS having the same constant potential as the potential of the first common wiring 431_A1 is supplied to the second common electrode 403_B via the second common wiring 431_B1 and the fourth common wiring 431_B2. As described above, the second common wiring 431_B1 and the fourth common wiring 431_B2 are independent of the first common wiring 431_A1 and the third common wiring 431_A2, respectively, and electrically couples the outside of the wiring substrate 430 to the second common electrode 403_B without passing through the driving circuit 410.

Each of the two signal lines 432_A is a wiring for transmitting the driving signal COM_A. On the other hand, each of the two signal lines 432_B is a wiring for transmitting the driving signal COM_B. Each of the signal lines 432_A and 432_B extends from the first end E1 toward the driving circuit 410 and is coupled to the driving circuit 410. Further, each of the signal lines 432_A and 432_B is coupled to the individual wirings 435_1 to 435_*n* via the driving circuit 410. As a result, each of the signal lines 432_A and 432_B electrically couples the outside of the wiring substrate 430 and the individual wirings 435_1 to 435_*n* via the driving circuit 410.

Here, the two signal lines 432_B and the two signal lines 432_A are arranged between the first common wiring 431_A1 and the third common wiring 431_A2. In the example illustrated in FIG. 8, the two signal lines 432_B are arranged between the two signal lines 432_A. Further, one of the two signal lines 432_A and one of the two signal lines 432_B are respectively arranged on the left side part of the wiring substrate 430 in FIG. 8, and the other one of the two signal lines 432_A and the other one of the two signal lines 432_B are respectively arranged in the right side part of the wiring substrate 430 in FIG. 8.

The wiring 433*a* is a wiring for transmitting the power supply potential VDD. The wiring 433*b* is a wiring for transmitting the power supply potential VHV. The wiring 433*c* is a wiring for transmitting the ground potential GND. The wiring 434*a* is a wiring for transmitting the clock signal SCK. The wiring 434*b* is a wiring for transmitting the print data signal SI. The wiring 434*c* is a wiring for transmitting the latch signal LAT. The wiring 434*d* is a wiring for transmitting the change signal CH. Each of these wirings extends from the first end E1 toward the driving circuit 410 and is coupled to the driving circuit 410.

In the example illustrated in FIG. 8, the wiring 433*a*, the wiring 433*b*, the wiring 433*c*, the wiring 434*a*, the wiring 434*b*, the wiring 434*c*, and the wiring 434*d* are arranged in this order. Further, the order of arrangement of these wirings is not limited to the example illustrated in FIG. 8, and is any order.

The individual wirings 435_1 to 435_*n* are wirings for transmitting the driving signal VOUT. Each of the individual wirings 435_1 to 435_*n* extends from the second end E2 toward the driving circuit 410 and is coupled to the driving circuit 410.

Here, the individual wirings 435_1 to 435_*n* correspond to the above-described nozzles N_1 to N_n, respectively, and are arranged in the order of the individual wirings 435_1 to 435_*n*. As described above, the individual wirings 435_1 to 435_*n* correspond to the individual electrodes 401_A1 to 401_An, respectively. Further, the individual wirings 435_1 to 435_*n* correspond to the individual electrodes 401_B1 to 401_Bn, respectively. Then, each of the individual wirings 435_1 to 435_*n* is coupled to the corresponding individual electrode 401 of the actuator substrate 420 described above at the second end E2.

In the present embodiment, each of the individual wirings 435_1 to 435_*n* branches in the middle and extends toward the second end E2. Therefore, each of the individual wirings 435_1 to 435_*n* has two parts provided at the second end E2 by branching. Then, the two parts are coupled to the corresponding terminal sections 401*a* and 401*b*. For example, the individual wiring 435_1 is electrically coupled to each of the individual electrodes 401_A1 and the individual electrodes 401_B1 by branching on the wiring substrate 430. As a result, a common driving signal VOUT is supplied to the two individual electrodes 401 corresponding to the common nozzle N.

Figure 9:
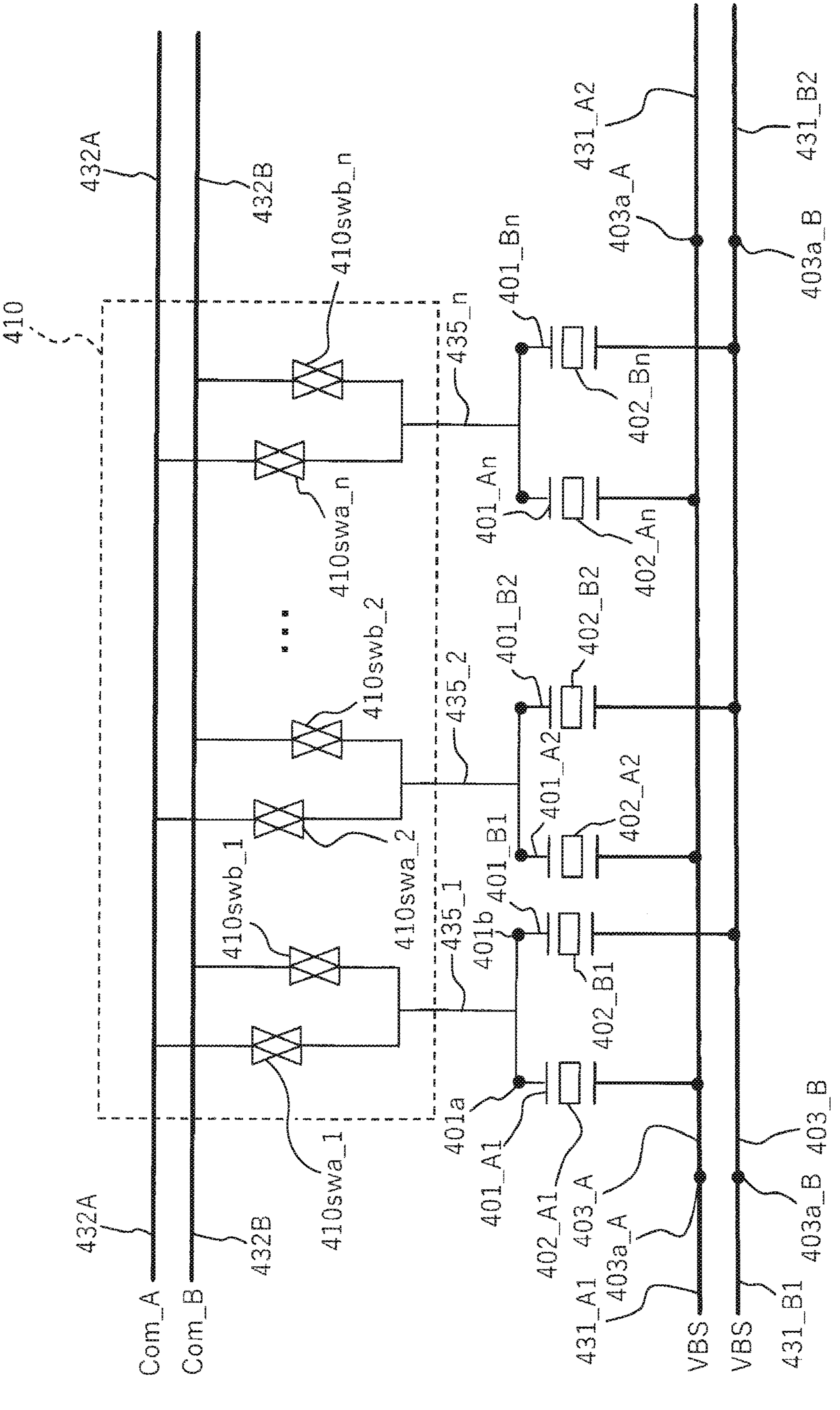
FIG. 9 is a schematic diagram for explaining the driving circuit according to the first embodiment.

Here, the switching element 410*sw* of the driving circuit 410 will be described with reference to FIG. 9. FIG. 9 is a schematic diagram for explaining an operation of the driving circuit 410. The plurality of switching elements 410*sw* include switching elements 410*swa*_1 to 410*swa*_*n* and switching elements 410*swb*_1 to 410*swb*_*n*. The switching elements 410*swa*_1 to 410*swa*_*n* are switching elements 410*sw* corresponding to each of the individual electrodes 401_A1 to 401_An and each of the individual electrodes 401_B1 to 401_Bn. The switching elements 410*swa*_1 to 410*swa*_*n* select whether to supply the driving signal COM_A to each piezoelectric element. The switching elements 410*swb*_1 to 410*swb*_*n* are switching elements 410*sw* corresponding to each of the individual electrodes 401_A1 to 401_An and each of the individual electrodes 401_B1 to 401_Bn. The switching elements 410*swb*_1 to 410*swb*_*n* select whether to supply the driving signal COM_B to each piezoelectric element 400.

Specifically, the switching element 410*swa*_1 selects whether to supply the driving signal COM_A to the individual electrodes 401_A1 and the individual electrode 401_B1, and the switching element 410*swa*_2 selects whether to supply the driving signal COM_A to the individual electrodes 401_A2 and the individual electrodes 401_B2, the switching element 410*swb*_1 selects whether to supply the driving signal COM_B to the individual electrodes 401_A1 and the individual electrode 401_B1, and the switching element 410*swb*_2 selects whether to supply the driving signal COM_B to the individual electrodes 401_A2 and the individual electrodes 401_B2.

That is, the plurality of switching elements 410*sw* are provided corresponding to each of the plurality of nozzles N. In other words, whether or not the driving signal COM_A or the driving signal COM_B is supplied to the two individual electrodes 401 by the common switching element 410*sw* is selected for the two individual electrodes 401 corresponding to the same nozzle N. With this configuration, the number of switching elements 410*sw* can be reduced as compared with the case where separate switching elements 410*sw* are provided corresponding to each of the two individual electrodes 401, and it is possible to reduce the size of the driving circuit 410 and suppress the heat generation.

Here, the driving signal COM_A or the driving signal COM_B is an example of the "driving signal".

Further, among the plurality of switching elements 410*sw*, any of the switching element 410*swa*_1 for selecting whether to supply the driving signal COM_A and the switching element 410*swb*_1 for selecting whether to supply the driving signal COM_B to the individual electrode 401_A1 which is an example of the "first individual electrode" and the individual electrode 401_B1 which is an example of the "second individual electrode" corresponding to the nozzle N_1 which is an example of the "first nozzle", is an example of a "first switching element".

Further, among the plurality of switching elements 410*sw*, any of the switching element 410*swa*_2 for selecting whether to supply the driving signal COM_A and the switching element 410*swb*_2 for selecting whether to supply the driving signal COM_B to the individual electrode 401_A2 which is an example of the "third individual electrode" and the individual electrode 401_B2 which is an example of the "fourth individual electrode" corresponding to the nozzle N_2 which is an example of the "second nozzle", is an example of a "second switching element".

1-7. Relay Substrate

Figure 10:
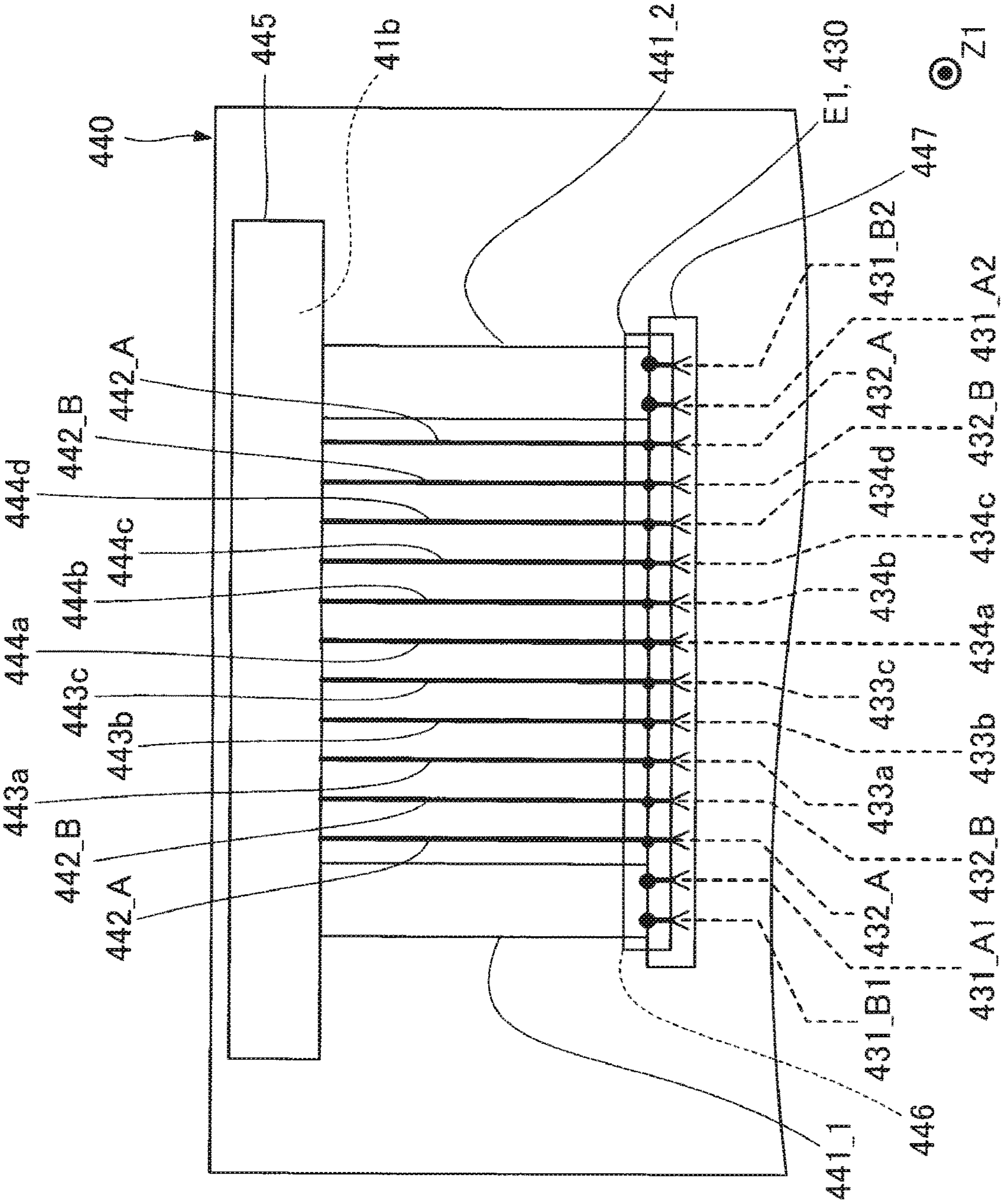
FIG. 10 is a schematic diagram for explaining a relay substrate according to the first embodiment.

FIG. 10 is a schematic diagram for explaining the relay substrate 440 according to the first embodiment. As illustrated in FIG. 10, the relay substrate 440 includes second relay wirings 441_1 and 441_2, two first relay wirings 442_A, two first relay wirings 442_B, and wirings 443*a*, 443*b*, 443*c*, 444*a*, 444*b*, 444*c*, and 444*d*. In FIG. 10, the connector 445, any one opening portion 447 among the plurality of opening portions 447, the first end E1 of the wiring substrate 430 inserted into the opening portion 447, and the second relay wirings 441_1 and 441_2, the two first relay wirings 442_A, the two first relay wirings 442_B, and the wirings 443*a*, 443*b*, 443*c*, 444*a*, 444*b*, 444*c*, and 444*d* corresponding to the wiring substrate 430 are illustrated. In addition, in FIG. 10, for the sake of simplification of the drawing, the relative positional relationship of the connector 445 or the opening portion 447, a coupling section 446, the second relay wirings 441_1 and 441_2, the two first relay wirings 442_A, the two first relay wirings 442_B, and the wirings 443*a*, 443*b*, 443*c*, 444*a*, 444*b*, 444*c*, and 444*d* is different from the actual one.

Here, the relay substrate 440 has the connector 445. The connector 445 is a component for coupling to the wiring member 43 described above. The relay substrate 440 has the above-described restoration circuit 41*b*, but is not illustrated in FIG. 10. In addition, the restoration circuit 41*b* may be arranged outside the connector 445. Although not illustrated, the connector 445 of the present embodiment is coupled to the second relay wirings 441_1 and 441_2, the two first relay wirings 442_A, the two first relay wirings 442_B, and the wirings 443*a*, 443*b*, 443*c*, 444*a*, 444*b*, 444*c*, and 444*d*, corresponding to each of the head chips 41*a*_1 to 41*a*_6.

The relay substrate 440 has the coupling section 446 which is a part coupled to a surface of the first end E1 of the wiring substrate 430 facing the Z2 direction.

Each of the second relay wirings 441_1 and 441_2 is a wiring for transmitting the offset potential VBS. Each of the second relay wirings 441_1 and 441_2 is provided from the connector 445 to the coupling section 446.

Here, the second relay wiring 441_1 is coupled to both the first common wiring 431_A1 and the second common wiring 431_B1 of the wiring substrate 430 described above by the coupling section 446. On the other hand, the second relay wiring 441_2 is coupled to both the third common wiring 431_A2 and the fourth common wiring 431_B2 of the wiring substrate 430 described above by the coupling section 446.

Each of the two first relay wirings 442_A is a signal line for transmitting the driving signal COM_A. On the other hand, each of the two first relay wirings 442_B is a signal line for transmitting the driving signal COM_B. Each of the first relay wirings 442_A and 442_B is provided from the connector 445 to the coupling section 446.

Here, the two first relay wirings 442_A are coupled to the two signal lines 432_A of the wiring substrate 430 described above by the coupling section 446. On the other hand, the two first relay wirings 442_B are coupled to the two signal lines 432_B of the wiring substrate 430 described above by the coupling section 446.

The wiring 443*a* is a wiring for transmitting the power supply potential VDD. The wiring 443*b* is a wiring for transmitting the power supply potential VHV. The wiring 443*c* is a wiring for transmitting the ground potential GND. The wiring 444*a* is a wiring for transmitting the clock signal SCK. The wiring 444*b* is a wiring for transmitting the print data signal SI. The wiring 444*c* is a wiring for transmitting the latch signal LAT. The wiring 444*d* is a wiring for transmitting the change signal CH. Each of these wirings is provided from the connector 445 to the coupling section 446.

In the example illustrated in FIG. 10, the wiring 443*a*, the wiring 443*b*, the wiring 443*c*, the wiring 444*a*, the wiring 444*b*, the wiring 444*c*, and the wiring 444*d* are arranged in this order. Further, the order of arrangement of these wirings is not limited to the example illustrated in FIG. 10, and is any order.

1-8. Head Chip Inspection

Figure 11:
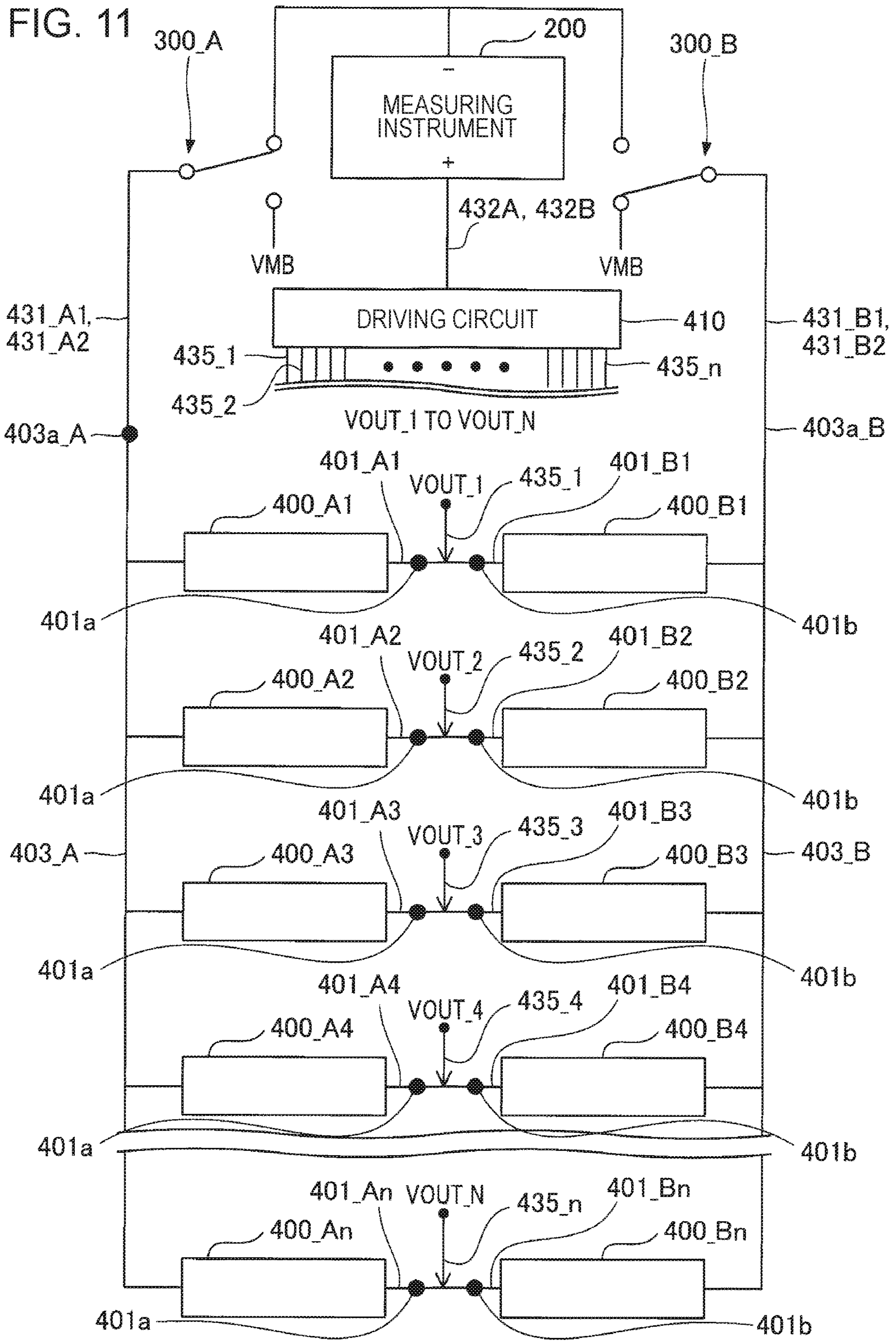
FIG. 11 is a diagram for explaining a performance inspection of the head chip.

FIG. 11 is a diagram for explaining a performance inspection of the head chip 41*a*. The performance inspection of the head chip 41*a* is performed using a measuring instrument 200 and switches 300_A and 300_B in a state where the relay substrate 440 is not coupled to the head chip 41*a*.

The measuring instrument 200 has a positive terminal and a negative terminal, and is an impedance analyzer that measures the impedance therebetween. The inspection signal is, for example, a Sin wave signal. The measuring instrument 200 is not limited to the impedance analyzer, and may be, for example, a current measuring instrument or a capacitance measuring instrument.

The positive terminal of the measuring instrument 200 is electrically coupled to the input side of the driving circuit 410, specifically, at least one of the signal line 432_A and the signal line 432_B. On the other hand, the negative terminal of the measuring instrument 200 is electrically coupled to the first common electrode 403_A by being coupled to the first common wiring 431_A1 and the third common wiring 431_A2 via the switch 300_A. Further, the negative terminal of the measuring instrument 200 is electrically coupled to the second common electrode 403_B by being coupled to the second common wiring 431_B1 and the fourth common wiring 431_B2 via the switch 300_B. The measuring instrument 200 outputs an inspection signal as the driving signal COM from the positive terminal. Further, when the performance inspection of the head chip 41*a* is performed, the drive of the driving circuit 410 is controlled by the control device by coupling the wiring 433*a*, 433*b*, 433*c*, 434*a*, 434*b*, 434*c*, and 434*d* to the control device (not illustrated).

The switch 300_A switches between a state where the first common electrode 403_A is electrically coupled to the negative terminal of the measuring instrument 200 and a state where the first common electrode 403_A is electrically coupled to a constant potential VMB. The switch 300_B switches between a state where the second common electrode 403_B is electrically coupled to the negative terminal of the measuring instrument 200 and a state where the second common electrode 403_B is electrically coupled to the constant potential VMB. The constant potential VMB is not particularly limited, but is, for example, a constant potential within the range of 0 V or more and 35 V or less.

The inspection of the piezoelectric elements 400_A1 to 400_An is performed in a state where the switch 300_A electrically couples the first common electrode 403_A to the negative terminal of the measuring instrument 200, and the switch 300_B electrically couples the second common electrode 403_B to the constant potential VMB. Here, when inspecting one desired piezoelectric element 400 among the piezoelectric elements 400_A1 to 400_An, the measuring instrument 200 controls the drive of the driving circuit 410 such that the driving signal VOUT which is an inspection signal is input only into the desired one piezoelectric element 400. Specifically, for example, when inspecting the piezoelectric element 400_A1, the driving circuit 410 supplies the driving signal VOUT only to the individual wiring 435_1 coupled to the piezoelectric element 400_A1. At this time, since the second common electrode 403_B is electrically coupled to the constant potential VMB by the switch 300_B, the piezoelectric element 400_A1 is arranged between the positive terminal and the negative terminal of the measuring instrument 200 instead of the piezoelectric element 400_B1. Therefore, even when the individual wiring 435_1 is a wiring common to the piezoelectric element 400_A1 and the piezoelectric element 400_B1, the impedance of only the piezoelectric element 400_A1 can be measured.

This is because the first common electrode 403_A coupled to the piezoelectric elements 400_A1 to 400_An and the second common electrode 403_B coupled to the piezoelectric elements 400_B1 to 400_Bn are independent and the first common wiring 431_A1 and the third common wiring 431_A2 coupled to the first common electrode 403_A and the second common wiring 431_B1 and the fourth common wiring 431_B2 coupled to the second common electrode 403_B are independent, and thus the switch 300_A coupled to the first common electrode 403_A and the switch 300_B coupled to the second common electrode 403_B can be provided separately.

On the other hand, the inspection of the piezoelectric elements 400_B1 to 400_Bn is performed in a state where the switch 300_A electrically couples the first common electrode 403_A to the constant potential VMB, and the switch 300_B electrically couples the second common electrode 403_B to the negative terminal of the measuring instrument 200. Here, when inspecting one desired piezoelectric element 400 among the piezoelectric elements 400_B1 to 400_Bn, the measuring instrument 200 controls the drive of the driving circuit 410 such that the driving signal VOUT which is an inspection signal is input only into the desired one piezoelectric element 400. Specifically, for example, when inspecting the piezoelectric element 400_B1, the driving circuit 410 supplies the driving signal VOUT only to the individual wiring 435_1 coupled to the piezoelectric element 400_B1. At this time, since the first common electrode 403_A is electrically coupled to the constant potential VMB by the switch 300_A, the piezoelectric element 400_B1 is arranged between the positive terminal and the negative terminal of the measuring instrument 200 instead of the piezoelectric element 400_A1. Therefore, even when the individual wiring 435_1 is a wiring common to the piezoelectric element 400_A1 and the piezoelectric element 400_B1, the impedance of only the piezoelectric element 400_B1 can be measured.

As described above, the head chip 41*a* includes the nozzle N_1 which is an example of a "first nozzle", the nozzle N_2 which is an example of a "second nozzle", the pressure chamber Ca_1 which is an example of a "first pressure chamber", the pressure chamber Cb_1 which is an example of a "second pressure chamber", the pressure chamber Ca_2 which is an example of a "third pressure chamber", the pressure chamber Cb_2 which is an example of a "fourth pressure chamber", the piezoelectric body 402_A1 which is an example of a "first piezoelectric body", the piezoelectric body 402_B1 which is an example of a "second piezoelectric body", the piezoelectric body 402_A2 which is an example of a "third piezoelectric body", the piezoelectric body 402_B2 which is an example of a "fourth piezoelectric body", the individual electrode 401_A1 which is an example of a "first individual electrode", the individual electrode 401_B1 which is an example of a "second individual electrode", the individual electrode 401_A2 which is an example of a "third individual electrode", the individual electrode 401_B2 which is an example of a "fourth individual electrode", the first common electrode 403_A, and the second common electrode 403_B.

Each of the nozzle N_1 and the nozzle N_2 ejects ink, which is an example of a "liquid". Each of the pressure chamber Ca_1 and the pressure chamber Cb_1 communicates with the nozzle N_1. Each of the pressure chamber Ca_2 and the pressure chamber Cb_2 communicates with the nozzle N_2. The piezoelectric body 402_A1 generates pressure in the pressure chamber Ca_1. The piezoelectric body 402_B1 generates pressure in the pressure chamber Cb_1. The piezoelectric body 402_A2 generates pressure in the pressure chamber Ca_2. The piezoelectric body 402_B2 generates pressure in the pressure chamber Cb_2. The individual electrode 401_A1 is coupled to the piezoelectric body 402_A1. The individual electrode 401_B1 is coupled to the piezoelectric body 402_B1. The individual electrode 401_A2 is coupled to the piezoelectric body 402_A2. The individual electrode 401_B2 is coupled to the piezoelectric body 402_B2. The first common electrode 403_A is commonly coupled to the piezoelectric body 402_A1 and the piezoelectric body 402_A2. The second common electrode 403_B is independent of the first common electrode 403_A and is commonly coupled to the piezoelectric body 402_B1 and the piezoelectric body 402_B2.

In the above head chip 41*a*, since the first common electrode 403_A and the second common electrode 403_B are independent of each other, even when a configuration is adopted in which the common driving signal VOUT is supplied to the individual electrodes 401 corresponding to the common nozzle N, the individual electrode 401_A1 or the individual electrode 401_A2 and the first common electrode 403_A, and the individual electrode 401_B1 or the individual electrode 401_B2 and the second common electrode 403_B can be individually supplied with signals. Therefore, the size of the head chip 41*a* can be reduced, and the performance of the piezoelectric element 400 can be individually inspected for each pressure chamber C.

Further, as described above, the head chip 41*a* includes a first common liquid chamber R1 communicating with the pressure chamber Ca_1 and the pressure chamber Ca_2, and a second common liquid chamber R2 communicating with the pressure chamber Cb_1 and the pressure chamber Cb_2. Therefore, ink is supplied to each pressure chamber Ca from the first common liquid chamber R1 or the second common liquid chamber R2, and ink is collected from each pressure chamber Cb to the first common liquid chamber R1 or the second common liquid chamber R2.

Here, as described above, the first common liquid chamber R1 is a flow path for supplying ink to the pressure chamber Ca_1 and the pressure chamber Ca_2. The second common liquid chamber R2 is a flow path for collecting ink from the pressure chamber Cb_1 and the pressure chamber Cb_2. Therefore, it is possible to realize an ink circulation configuration in which ink is supplied from the first common liquid chamber R1 to each pressure chamber Ca and the ink from each pressure chamber Cb is collected to the second common liquid chamber R2.

Further, as described above, the head chip 41*a* includes the pressure chamber substrate 412 having the pressure chamber Ca_1, the pressure chamber Cb_1, the pressure chamber Ca_2, and the pressure chamber Cb_2, and the vibrating plate 415 laminated on the pressure chamber substrate 412. Then, the piezoelectric body 402_A1 is located between the individual electrode 401_A1 and the first common electrode 403_A. The piezoelectric body 402_B1 is located between the individual electrode 401_B1 and the second common electrode 403_B. The piezoelectric body 402_A2 is located between the individual electrode 401_A2 and the first common electrode 403_A. The piezoelectric body 402_B2 is located between the individual electrode 401_B2 and the second common electrode 403_B. With such an arrangement of electrodes, the performance inspection of the head chip 41*a* can be performed for each pressure chamber C.

Furthermore, as described above, the head chip 41*a* includes the nozzle array LN composed of the plurality of nozzles N arranged in the nozzle array direction DN. In addition, the nozzle N_1 and the nozzle N_2 are arranged in the nozzle array direction DN, and form a part of the nozzle array LN. Therefore, the nozzle N_1 is arranged between the pressure chamber Ca_1 and the pressure chamber Cb_1 and the nozzle N_2 is arranged between the pressure chamber Ca_2 and the pressure chamber Cb_2 when viewed in the ejection direction of ink from the nozzle N_1 or the nozzle N_2.

Further, as described above, the pressure chamber Ca_1 and the pressure chamber Cb_1 are arranged in the direction intersecting the nozzle array direction DN. The pressure chamber Ca_2 and the pressure chamber Cb_2 are arranged in the direction intersecting the nozzle array direction DN. The pressure chamber Ca_1 and the pressure chamber Ca_2 are arranged in the nozzle array direction DN. The pressure chamber Cb_1 and the pressure chamber Cb_2 are aligned in the nozzle array direction DN. Then, the nozzle N_1 is arranged between the pressure chamber Ca_1 and the pressure chamber Cb_1 when viewed in the ejection direction of ink from the nozzle N_1 or the nozzle N_2. The nozzle N_2 is arranged between the pressure chamber Ca_2 and the pressure chamber Cb_2 when viewed in the ejection direction of ink from the nozzle N_1 or the nozzle N_2. Therefore, it is possible to individually apply a voltage between the individual electrode 401_A1 or the individual electrode 401_A2 and the first common electrode 403_A, and between the individual electrode 401_B1 or the individual electrode 401_B2 and the second common electrode 403_B.

Furthermore, as described above, the head chip 41*a* includes the wiring substrate 430 that mounts the driving circuit 410 that drives the piezoelectric body 402_A1, the piezoelectric body 402_B1, the piezoelectric body 402_A2, and the piezoelectric body 402_B2. In addition, the wiring substrate 430 includes the individual wiring 435_1 which is an example of a "first individual wiring", the individual wiring 435_2 which is an example of a "second individual wiring", the signal lines 432_A and 432_B, the first common wiring 431_A1, and the second common wiring 431_B1. The signal lines 432_A and 432_B electrically couple the outside of the wiring substrate 430 to the individual wiring 435_1 and the individual wiring 435_2 via the driving circuit 410. The individual wiring 435_1 electrically couples the driving circuit 410 to the individual electrodes 401_A1 and the individual electrodes 401_B1. Therefore, a common driving signal can be supplied to the individual electrode 401_A1 and the individual electrode 401_B1 by using the individual wiring 435_1. The individual wiring 435_2 electrically couples the driving circuit 410 to the individual electrodes 401_A2 and the individual electrodes 401_B2. Therefore, a common driving signal can be supplied to the individual electrodes 401_A2 and the individual electrodes 401_B2 by using the individual wiring 435_2.

The first common wiring 431_A1 electrically couples the outside of the wiring substrate 430 and the first common electrode 403_A without going through the driving circuit 410. The second common wiring 431_B1 is independent of the first common wiring 431_A1 and electrically couples the outside of the wiring substrate 430 and the second common electrode 403_B without going through the driving circuit 410. Therefore, a constant potential can be supplied from the outside of the wiring substrate 430 to the first common electrode 403_A by using the first common wiring 431_A1, and a constant potential can be supplied to the second common wiring 403_B from the outside of the wiring substrate 430 by using the second common electrode 431_B1.

Further, as described above, the head chip 41*a* includes the actuator substrate 420. The actuator substrate 420 has the pressure chamber Ca_1, the pressure chamber Cb_1, the pressure chamber Ca_2, and the pressure chamber Cb_2, and the individual electrode 401_A1, the individual electrode 401_B1, the individual electrode 401_A2, and the individual electrode 401_B2 are mounted thereon. The individual wiring 435_1 is electrically coupled to each of the individual electrodes 401_A1 and the individual electrodes 401_B1 by branching on the wiring substrate 430. The individual wiring 435_2 is electrically coupled to each of the individual electrodes 401_A2 and the individual electrodes 401_B2 by branching on the wiring substrate 430. Therefore, it is possible to realize the wiring substrate 430 that can be used for the actuator substrate 420 having a configuration in which individual electrodes are independent for each pressure chamber C. Unlike the wiring substrate 430, such an actuator substrate 420 is independent without branching individual wiring, and when each of the individual wirings is coupled to the wiring substrate having a configuration corresponding to each of the individual electrodes, it is possible to realize a head chip that separately drives the two piezoelectric elements 400 corresponding to the same nozzle N.

Furthermore, as described above, the first common wiring 431_A1 supplies a constant potential to the first common electrode 403_A. The second common wiring 431_B1 supplies a constant potential having the same potential as the first common wiring 431_A1 to the second common electrode 403_B. Therefore, each piezoelectric body 402 can be driven in the same manner as when the first common electrode 403_A and the second common electrode 403_B are shared.

Further, as described above, the driving signal COM_A and the driving signal COM_B for driving the piezoelectric body 402_A1, the piezoelectric body 402_B1, the piezoelectric body 402_A2, and the piezoelectric body 402_B2 are supplied to the signal line 432_A and the signal line 432_B, respectively. The driving circuit 410 has the plurality of switching elements 410*sw* for selecting whether to supply the driving signal COM_A to the individual electrodes 401_A1 and the individual electrodes 401_B1, and the plurality of switching elements 410*sw* for selecting whether to supply the driving signal COM_A to the individual electrodes 401_A2 and the individual electrodes 401_B2. Further, the driving circuit 410 has the plurality of switching elements 410*sw* for selecting whether to supply the driving signal COM_B to the individual electrodes 401_A1 and the individual electrodes 401_B1, and the plurality of switching elements 410*sw* for selecting whether to supply the driving signal COM_B to the individual electrodes 401_A2 and the individual electrodes 401_B2. Therefore, the number of switching elements 410*sw* can be reduced as compared with the configuration in which separate switching elements 410*sw* are provided for the plurality of individual electrodes 401 corresponding to the same nozzle N. As a result, the size of the driving circuit 410 can be reduced.

Furthermore, as described above, the wiring substrate 430 has the third common wiring 431_A2 and the fourth common wiring 431_B2. The third common wiring 431_A2 is independent of the first common wiring 431_A1 and the second common wiring 431_B1 and electrically couples the outside of the wiring substrate 430 to the first common electrode 403_A without going through the driving circuit 410. The fourth common wiring 431_B2 is independent of the first common wiring 431_A1, the second common wiring 431_B1, and the third common wiring 431_A2, and electrically couples the outside of the wiring substrate 430 and the second common electrode 403_B without going through the driving circuit 410. Then, the driving circuit 410 is arranged between the first common wiring 431_A1 and the second common wiring 431_B1 and the third common wiring 431_A2 and the fourth common wiring 431_B2 in the thickness direction of the wiring substrate 430. Therefore, a constant potential for the common electrode 403 can be supplied to the vicinity of both ends of the actuator substrate 420 in the longitudinal direction. As a result, it is possible to reduce the potential drop of the common electrode 403 due to the different positions in the nozzle array direction DN.

Further, as described above, the liquid ejecting head 41 has at least one head chip 41*a* and the relay substrate 440. The relay substrate 440 has the first relay wirings 442_A and 442_B that are electrically coupled in common to the signal lines 432_A and 432_B, and the second relay wiring 441_1 electrically coupled to the first common wiring 431_A1 and the second common wiring 431_B1. Therefore, since the first common wiring 431_A1 and the second common wiring 431_B1 are shared by the second relay wiring 441_1, it is possible to simplify the wiring routing. Further, the thickness of the second relay wiring 441_1 can be increased, and as a result, it is possible to prevent a decrease in the potential for the first common wiring 431_A1 and the second common wiring 431_B1.

In the present embodiment, as described above, the wiring substrates 430 of each of the plurality of head chips 41*a* are coupled to the relay substrate 440. When one liquid ejecting head 41 includes the plurality of head chips 41*a* as described above, when the performance inspection cannot be performed for each head chip 41*a*, the yield at the time of manufacturing the liquid ejecting head 41 is poor. Therefore, in this case, it is particularly useful to be able to inspect the performance of each head chip 41*a* in order to improve the yield.

2. Second Embodiment

Hereinafter, a second embodiment of the present disclosure will be described. Hereinafter, the differences from the first embodiment will be mainly described.

Figure 12:
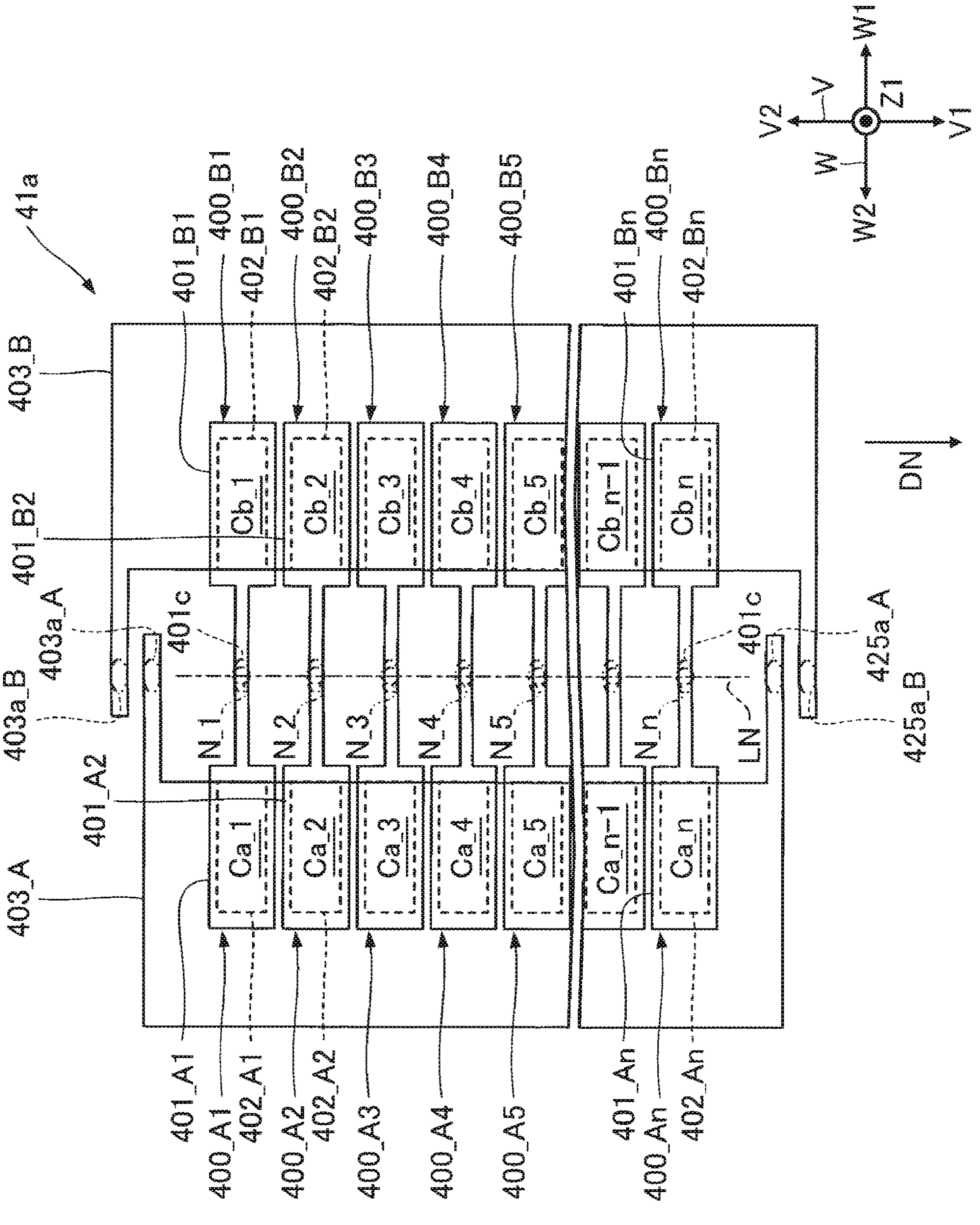
FIG. 12 is a schematic plan view for explaining a piezoelectric element according to a second embodiment.

FIG. 12 is a schematic plan view for explaining the piezoelectric element 400 in the second embodiment. In the present embodiment, the individual electrodes 401_A1 to 401_An and the individual electrodes 401_B1 to 401_Bn are electrically coupled to each other on the actuator substrate 420 for each nozzle N. Here, the individual electrodes 401_A1 to 401_An and the individual electrodes 401_B1 to 401_Bn have a terminal section 401*c* for coupling to the wiring substrate 430 for each nozzle N. The terminal sections 401*c* are arranged in the nozzle array direction DN. In the example illustrated in FIG. 12, each of the nozzles N_1 to N_n overlaps the corresponding terminal section 401*c* in plan view.

Figure 13:
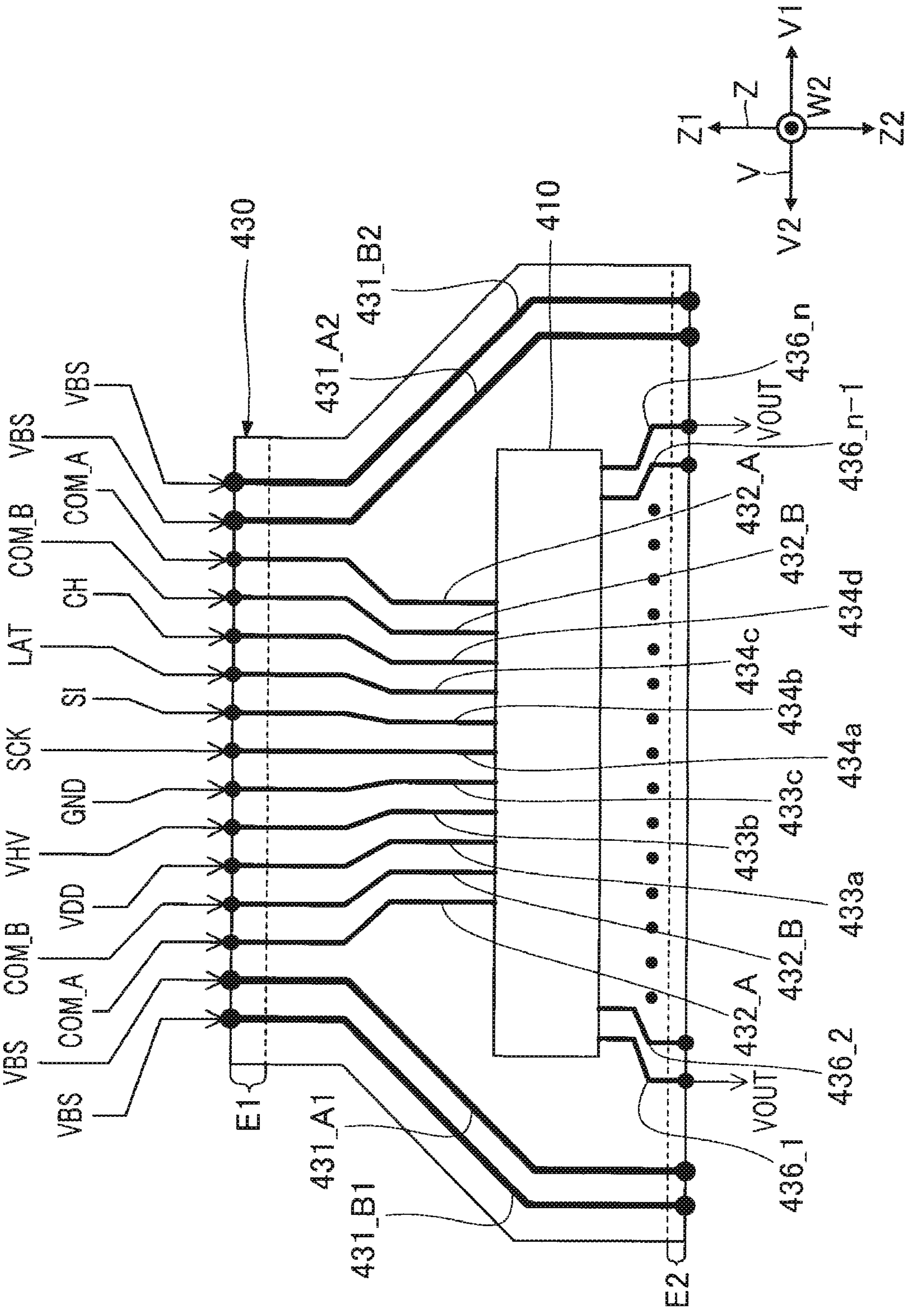
FIG. 13 is a schematic diagram for explaining a wiring substrate according to the second embodiment.

FIG. 13 is a schematic diagram for explaining the wiring substrate 430 according to the second embodiment. In the present embodiment, each of the individual wirings 435_1 to **435_*n* extends toward the second end E2 without branching. Then, each of the individual wirings 435_1 to 435_*n* is coupled to the corresponding terminal section 401***c*. As a result, a common driving signal VOUT is supplied to the two individual electrodes 401 corresponding to the common nozzle N.

Also in the above second embodiment, the size of the head chip 41*a* can be reduced and each pressure chamber C can be individually inspected. In the present embodiment, as described above, the individual electrodes 401_A1 and the individual electrodes 401_B1 are electrically coupled to each other by the actuator substrate 420. Therefore, the number of terminals of the wiring substrate 430 can be reduced.

Further, as described above, one end of the individual wiring 435_1 is a terminal common to the individual electrode 401_A1 and the individual electrode 401_B1, and one end of the individual wiring 435_2 is a terminal common to the individual electrode 401_A2 and the individual electrode 401_B2. Therefore, the number of terminals of the wiring substrate 430 can be reduced.

3. Third Embodiment

Hereinafter, a third embodiment of the present disclosure will be described. Hereinafter, the differences from the first embodiment will be mainly described.

Figure 14:
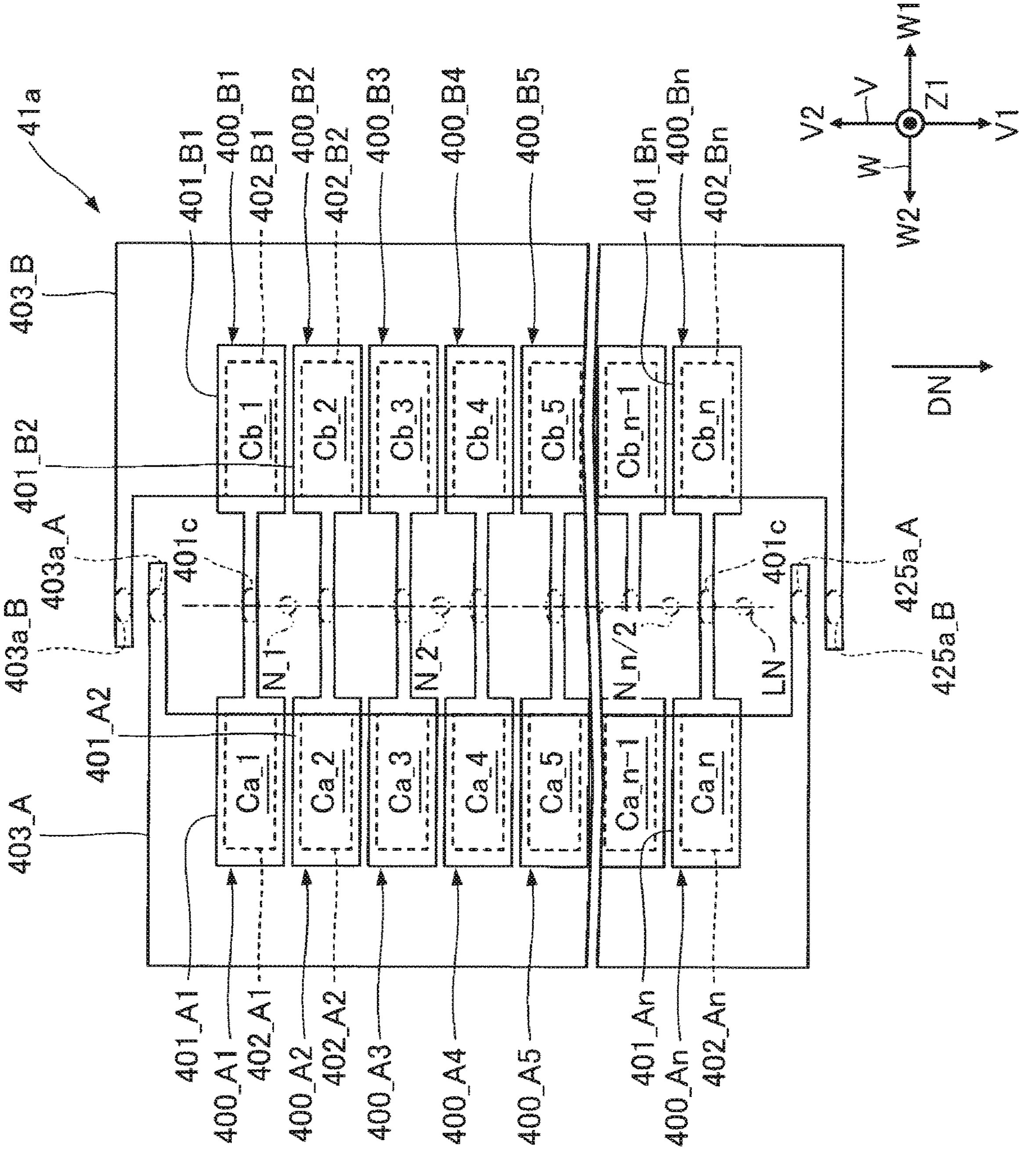
FIG. 14 is a schematic plan view for explaining a piezoelectric element according to a third embodiment.

FIG. 14 is a schematic plan view for explaining the piezoelectric element 400 in the third embodiment. The present embodiment is the same as the above-described second embodiment except that four pressure chambers C communicate with one nozzle N. Therefore, the number of the piezoelectric elements 400 corresponding to the pressure chamber Ca and the number of the piezoelectric elements 400 corresponding to the pressure chamber Cb are n, respectively, whereas the number of the nozzles N constituting the nozzle array LN is n/2.

In the present embodiment, ink is discharged from the nozzle N by simultaneously driving the piezoelectric elements 400 corresponding to the four pressure chambers C communicating with the common nozzle N.

Here, of the two nozzles N selected from the nozzles N_1 to N_n/2 in any manner, one is the "first nozzle" and the other one is the "second nozzle". Of the two pressure chambers Ca and the two pressure chambers Cb communicating with the first nozzle, any one of the pressure chambers Ca is an example of a "first pressure chamber", and any one of the pressure chambers Cb is an example of a "second pressure chamber". Of the two pressure chambers Ca and the two pressure chambers Cb communicating with the second nozzle, any one of the pressure chambers Ca is an example of a "third pressure chamber", and any one of the pressure chambers Cb is an example of a "fourth pressure chamber". Further, the individual electrode 401 corresponding to the "first pressure chamber" is the "first individual electrode", the individual electrode 401 corresponding to the "second pressure chamber" is the "second individual electrode", the individual electrode 401 corresponding to the "third pressure chamber" is the "third individual electrode", and the individual electrode 401 corresponding to the "fourth pressure chamber" is the "fourth individual electrode".

Also in the above third embodiment, the size of the head chip 41*a* can be reduced or heat generation can be suppressed, and each pressure chamber C can be individually inspected.

4-1. Modification Example 1

In each of the above-described aspects, a configuration using two types of driving signals COM_A and COM_B is exemplified, but the configuration is not limited thereto, and the number of types of driving signals input into the driving circuit 410 may be one or three or more. Further, the number of pulses included in the driving signal COM may be one or three or more.

4-2. Modification Example 2

In each of the above-described aspects, a configuration in which the plurality of head chips 41*a* are mounted on the liquid ejecting head 41 is exemplified, but the configuration is not limited thereto, and the number of the plurality of head chips 41*a* mounted on the liquid ejecting head 41 may be any number and may be one.

4-3. Modification Example 3

In each of the above-described aspects, a configuration in which two or four pressure chambers C correspond to one nozzle N is exemplified, but the configuration is not limited to the configuration, and the number of pressure chambers C corresponding to one nozzle N may be, for example, 6 or 8 or more.

4. Modification Example

Each of the aspects in the above-described examples can be modified in various manners. Specific modifications which may be applied to each of the above-described aspects will be described below. The aspects selected in any manner from the following examples can be appropriately combined with each other within a range of not being inconsistent with each other.

4-4. Modification Example 4

In each of the above-described aspects, a configuration in which the ink used for the liquid ejecting head is circulated by a circulation mechanism is exemplified, but the configuration is not limited to this configuration, and a configuration without such a circulation mechanism may be used.

4-5. Modification Example 5

In each of the above-described aspects, the line type liquid ejecting apparatus 100 in which the plurality of nozzles N are distributed over the entire width of the medium M is exemplified, but the present disclosure is also applied to a serial type liquid ejecting apparatus in which a transport body equipped with the liquid ejecting head 41 is reciprocated in the width direction of the medium M.

4-6. Modification Example 6

The liquid ejecting apparatus 100 exemplified in each of the above-described aspects may be adopted in various devices such as a facsimile machine and a copier, in addition to a device dedicated to printing, and the application of the present disclosure is not particularly limited. However, the application of the liquid ejecting apparatus is not limited to printing. For example, a liquid ejecting apparatus that ejects a solution of a coloring material is used as a manufacturing device for forming a color filter of a display device such as a liquid crystal display panel. Further, the liquid ejecting apparatus that emits a solution of a conductive material is used as a manufacturing device for forming wiring or electrodes on the wiring substrate. Further, a liquid ejecting apparatus that emits a solution of an organic substance related to a living body is used, for example, as a manufacturing device for manufacturing a biochip.

4-7. Modification Example 7

In each of the above aspects, the drive module 42 constitutes the head unit 40 together with the liquid ejecting head 41, but the present disclosure is not limited to this configuration. For example, the drive module 42 may be a part of the control unit 20.

What is claimed is:

1. A head chip comprising:

a first nozzle configured to eject a liquid;

a second nozzle configured to eject a liquid;

a first pressure chamber communicating with the first nozzle;

a second pressure chamber communicating with the first nozzle;

a third pressure chamber communicating with the second nozzle;

a fourth pressure chamber communicating with the second nozzle;

a first piezoelectric body configured to generate a pressure in the first pressure chamber;

a second piezoelectric body configured to generate a pressure in the second pressure chamber;

a third piezoelectric body configured to generate a pressure in the third pressure chamber;

a fourth piezoelectric body configured to generate a pressure in the fourth pressure chamber;

a first individual electrode coupled to the first piezoelectric body;

a second individual electrode coupled to the second piezoelectric body;

a third individual electrode coupled to the third piezoelectric body;

a fourth individual electrode coupled to the fourth piezoelectric body;

a first common electrode commonly coupled to the first piezoelectric body and the third piezoelectric body;

a second common electrode that is independent of the first common electrode and is commonly coupled to the second piezoelectric body and the fourth piezoelectric body;

a first common liquid chamber communicating with the first pressure chamber and the third pressure chamber; and a second common liquid chamber communicating with the second pressure chamber and be fourth pressure chamber.

2. The head chip according to claim 1, wherein the first common liquid chamber is a flow path for supplying a liquid to the first pressure chamber and the third pressure chamber, and the second common liquid chamber is a flow path for collecting a liquid from the second pressure chamber and the fourth pressure chamber.

3. The head chip according to claim 1, further comprising:

a pressure chamber substrate having the first pressure chamber, the second pressure chamber, the third pressure chamber, and the fourth pressure chamber; and a vibrating plate laminated on the pressure chamber substrate, wherein the first piezoelectric body is located between the first individual electrode and the first common electrode, the second piezoelectric body is located between the second individual electrode and the second common electrode, the third piezoelectric body is located between the third individual electrode and the first common electrode, and the fourth piezoelectric body is located between the fourth individual electrode and the second common electrode.

4. The head chip according to claim 1, further comprising:

a nozzle array composed of a plurality of nozzles arranged in a nozzle array direction, wherein the first nozzle and the second nozzle are arranged in the nozzle array direction and form a part of the nozzle array.

5. The head chip according to claim 4, wherein the first pressure chamber and the second pressure chamber are arranged in a direction intersecting the nozzle array direction, the third pressure chamber and the fourth pressure chamber are arranged in the direction intersecting the nozzle array direction, the first pressure chamber and the third pressure chamber are arranged in the nozzle array direction, the second pressure chamber and the fourth pressure chamber are arranged in the nozzle array direction, the first nozzle is arranged between the first pressure chamber and the second pressure chamber when viewed in an ejection direction of a liquid from the first nozzle, and the second nozzle is arranged between the third pressure chamber and the fourth pressure chamber when viewed in the ejection direction.

6. A head chip comprising:

a first nozzle configured to eject a liquid;

a second nozzle configured to eject a liquid;

a first pressure chamber communicating with the first nozzle;

a second pressure chamber communicating with the first nozzle;

a third pressure chamber communicating with the second nozzle;

a fourth pressure chamber communicating with the second nozzle;

a first piezoelectric body configured to generate a pressure in the first pressure chamber;

a second piezoelectric body configured to generate a pressure in the second pressure chamber;

a third piezoelectric body configured to generate a pressure in the third pressure chamber;

a fourth piezoelectric body configured to generate a pressure in the fourth pressure chamber;

a first individual electrode coupled to the first piezoelectric body;

a second individual electrode coupled to the second piezoelectric body;

a third individual electrode coupled to the third piezoelectric body;

a fourth individual electrode coupled to the fourth piezoelectric body;

a first common electrode commonly coupled to the first piezoelectric body and the third piezoelectric body;

a second common electrode that is independent of the first common electrode and is commonly coupled to the second piezoelectric body and the fourth piezoelectric body; and a wiring substrate on which a driving circuit for driving the first piezoelectric body, the second piezoelectric body, the third piezoelectric body, and the fourth piezoelectric body is mounted, wherein the wiring substrate includes a first individual wiring that electrically couples the driving circuit and the first and second individual electrodes, a second individual wiring that electrically couples the driving circuit and the third and fourth individual electrodes, a signal line that electrically couples an outside of the wiring substrate and the first and second individual wirings via the driving circuit, a first common wiring that electrically couples the outside of the wiring substrate and the first common electrode without going through the driving circuit, and a second common wiring that is independent of the first common wiring and electrically couples the outside of the wiring substrate and the second common electrode without going through the driving circuit.

7. The head chip according to claim 6, further comprising:

an actuator substrate which has the first pressure chamber, the second pressure chamber, the third pressure chamber, and the fourth pressure chamber, and on which the first individual electrode, the second individual electrode, the third individual electrode, and the fourth individual electrode are mounted, wherein the first individual wiring is electrically coupled to each of the first individual electrode and the second individual electrode by branching on the wiring substrate, and the second individual wiring is electrically coupled to each of the third individual electrode and the fourth individual electrode by branching on the wiring substrate.

8. The head chip according to claim 6, further comprising:

an actuator substrate which has the first pressure chamber, the second pressure chamber, the third pressure chamber, and the fourth pressure chamber, and on which the first individual electrode, the second individual electrode, the third individual electrode, and the fourth individual electrode are mounted, wherein the first individual electrode and the second individual electrode are electrically coupled to each other on the actuator substrate, and the third individual electrode and the fourth individual electrode are electrically coupled to each other on the actuator substrate.

9. The head chip according to claim 8, wherein one end of the first individual wiring is a terminal common to the first individual electrode and the second individual electrode, and one end of the second individual wiring is a terminal common to the third individual electrode and the fourth individual electrode.

10. The head chip according to claim 6, wherein the first common wiring supplies a constant potential to the first common electrode, and the second common wiring supplies a constant potential, which is the same as that of the first common wiring, to the second common electrode.

11. The head chip according to claim 6, wherein a driving signal for driving the first piezoelectric body, the second piezoelectric body, the third piezoelectric body, and the fourth piezoelectric body is supplied to the signal line, and the driving circuit includes a first switching element for selecting whether to supply the driving signal to the first individual electrode and the second individual electrode and a second switching element for selecting whether to supply the driving signal to the third individual electrode and the fourth individual electrode.

12. The head chip according to claim 6, wherein the wiring substrate has a third common wiring that is independent of the first common wiring and the second common wiring and electrically couples the outside of the wiring substrate and the first common electrode without going through the driving circuit, and a fourth common wiring that is independent of the first common wiring, the second common wiring, and the third common wiring, and electrically couples the outside of the wiring substrate and the second common electrode without going through the driving circuit, and the driving circuit is arranged between the first and second common wirings and the third and fourth common wirings in a thickness direction of the wiring substrate.

13. A liquid ejecting head comprising:

at least one head chip according to claim 6; and a relay substrate, wherein the relay substrate includes a first relay wiring electrically coupled to the signal line, and a second relay wiring electrically coupled in common to the first common wiring and the second common wiring.

14. A liquid ejecting head comprising:

a plurality of head chips according to claim 6; and a relay substrate coupled to the wiring substrate of each of the plurality of head chips, wherein the relay substrate includes a first relay wiring electrically coupled to the signal line, and a second relay wiring electrically coupled in common to the first common wiring and the second common wiring.

15. A liquid ejecting head comprising:

the head chip according to claim 1; and a relay substrate coupled to the head chip.

16. A liquid ejecting apparatus comprising:

the liquid ejecting head according to claim 13; and a wiring member coupled to the liquid ejecting head.

* * * * *